(12) United States Patent
Koenig et al.

(10) Patent No.: US 6,275,510 B1
(45) Date of Patent: *Aug. 14, 2001

(54) TELECOMMUNICATIONS MULTIPLEXER

(75) Inventors: Roger L. Koenig; S. Christopher Alaimo; Thomas E. Bullington; Phillip D. Clark, all of Boulder; Kenneth C. Grobaski, Berthoud; Matthew D. Morris, Boulder; Kirkton I. Shoop, Longmont; Michael A. Trofi, Boulder, all of CO (US)

(73) Assignee: Carrier Access Corporation, Boulder, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 09/449,190

(22) Filed: Nov. 24, 1999

Related U.S. Application Data

(62) Division of application No. 08/962,757, filed on Nov. 3, 1997, now Pat. No. 5,991,312.

(51) Int. Cl.$^7$ ........................................... H04J 3/04
(52) U.S. Cl. ............................. 370/535; 370/216
(58) Field of Search ..................... 370/535, 216, 370/331, 217, 222, 221, 225, 227, 228, 536, 537, 538, 541, 542, 465, 543, 401, 403, 404, 405, 406, 442, 347, 351, 249, 252, 253

(56) References Cited

U.S. PATENT DOCUMENTS

| | | | |
|---|---|---|---|
| 5,392,276 | 2/1995 | Tran | 370/29 |
| 5,403,208 | 4/1995 | Felcman et al. | 439/633 |
| 5,420,986 | 5/1995 | Baldwin et al. | 395/325 |
| 5,512,906 | 4/1996 | Speciale | 342/375 |
| 5,515,367 | 5/1996 | Cox, Jr. et al. | 370/60.1 |
| 5,517,623 | 5/1996 | Farrell et al. | 395/281 |
| 5,553,056 | 9/1996 | Bronte et al. | 370/13 |
| 5,574,726 | 11/1996 | Chan et al. | 370/85.3 |
| 5,577,039 | 11/1996 | Won et al. | 370/60.1 |
| 5,594,726 | 1/1997 | Thompson et al. | 370/485 |
| 5,595,241 | 1/1997 | Jelinek | 165/80.1 |
| 5,600,788 | 2/1997 | Lofgren et al. | 395/183.07 |
| 5,634,822 | 6/1997 | Gunell | 439/668 |
| 5,991,312 | * 11/1999 | Koenig et al. | 370/535 |
| 6,011,789 | * 1/2000 | Schilling | 370/342 |

OTHER PUBLICATIONS

WESCOM 3551–00 Ti Network Interface Unit (NIU) written description, Sep. 1992, pp. 1–11.

* cited by examiner

*Primary Examiner*—Dang Ton
(74) *Attorney, Agent, or Firm*—F. A. Sirr; E. C. Hancock; Holland & Hart LLP

(57) ABSTRACT

A multiplexer for multiplexing and demultiplexing signals between a low-speed network and a higher speed network includes 7 quad DSX-1 cards and 1 spare card. The spare card is connected to the DSX-1 cards to allow the spare card to automatically be switched in for one of the DSX-1 cards or to allow interface electronics on the spare card to replace selected ones of interface electronics on different DSX-1 cards simultaneously. A pair of controller cards, a primary card and a secondary card, perform M1-3 multiplexing and demultiplexing and the DS-3 framing and transceiving. The controller cards can be selected or deselected in a short time period alarms are not set off and so that the transition is hitless by electronically enabling and disabling the transceiver. The multiplexer is connectable to 2 different T-3 links to provide network redundancy. An array of relays connected either controller card to either of the T-3 links. The controller cards are externally connectable to a computer network for external control thereof. The multiplexer is housed within a reduced volume which occupies a single rack unit on a standard vertical rack used for telecommunications equipment due to a dual backplane architecture in which an external backplane serves as the external connector plane while a separate internal backplane serves as the connection to the DSX-1 cards and controller cards.

17 Claims, 26 Drawing Sheets

(SEE FIG. 2B)

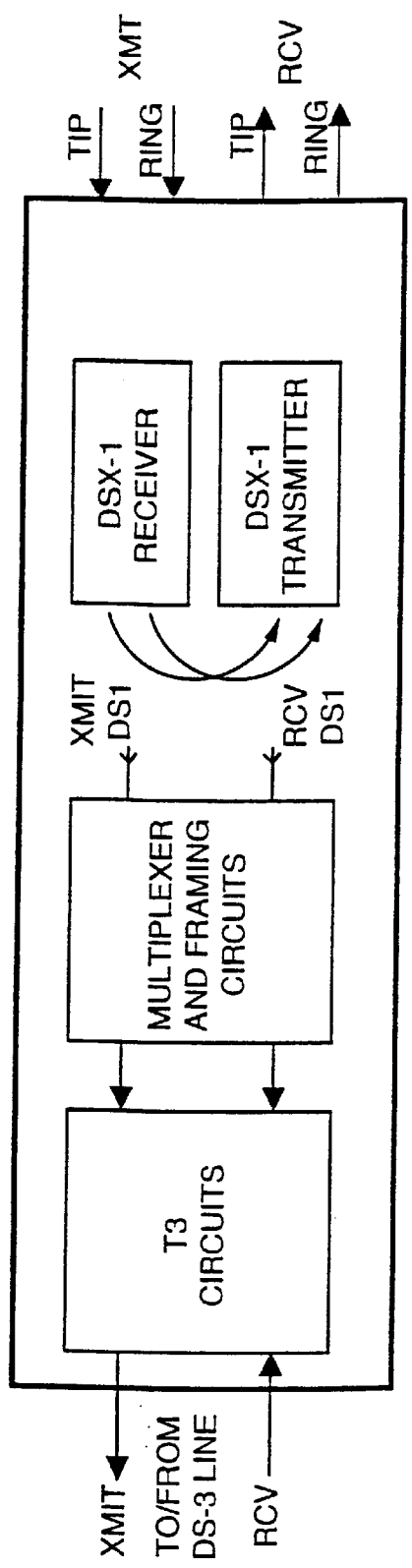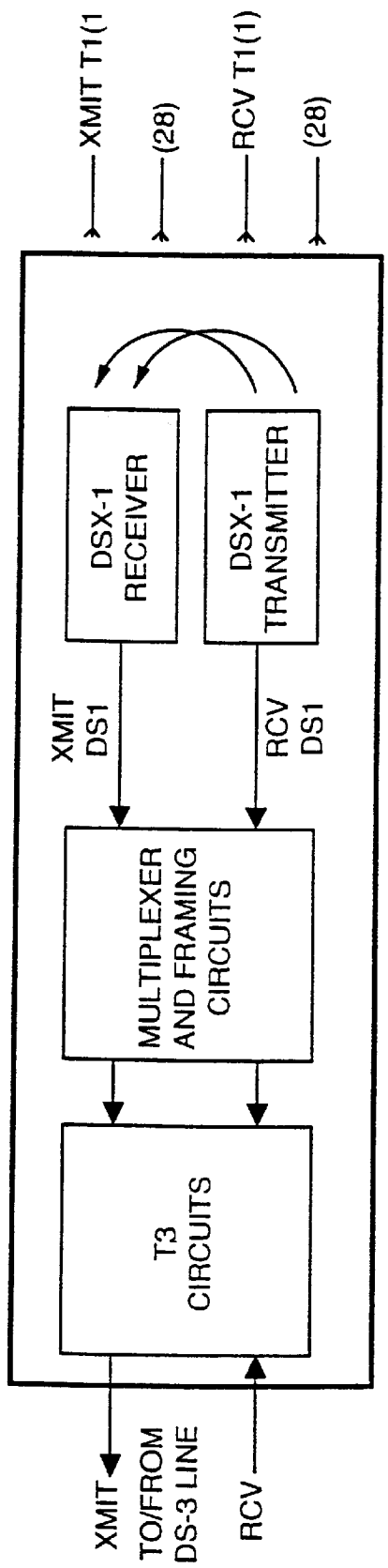

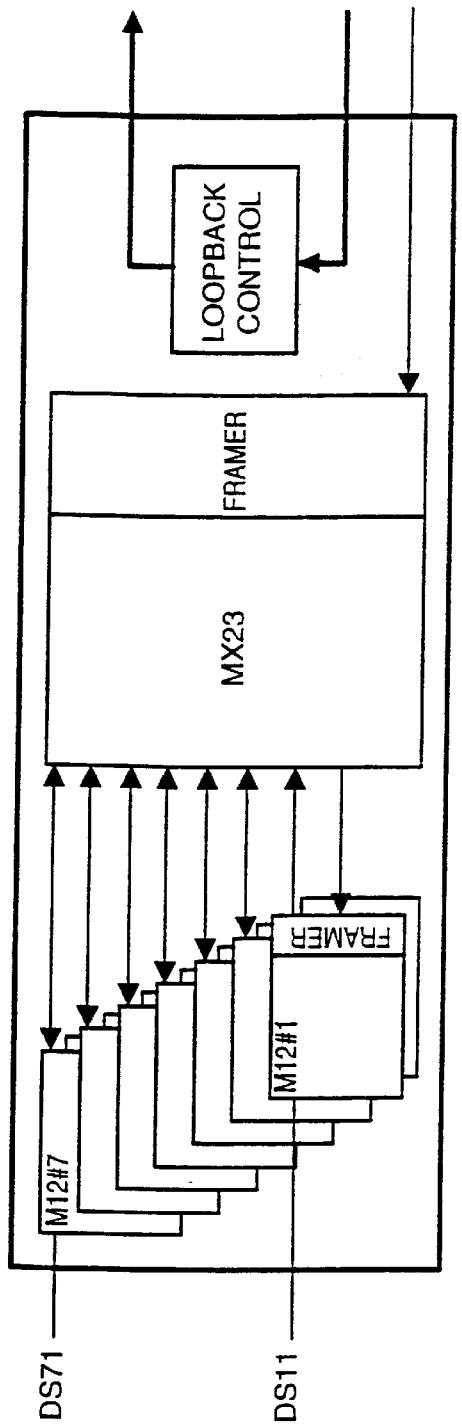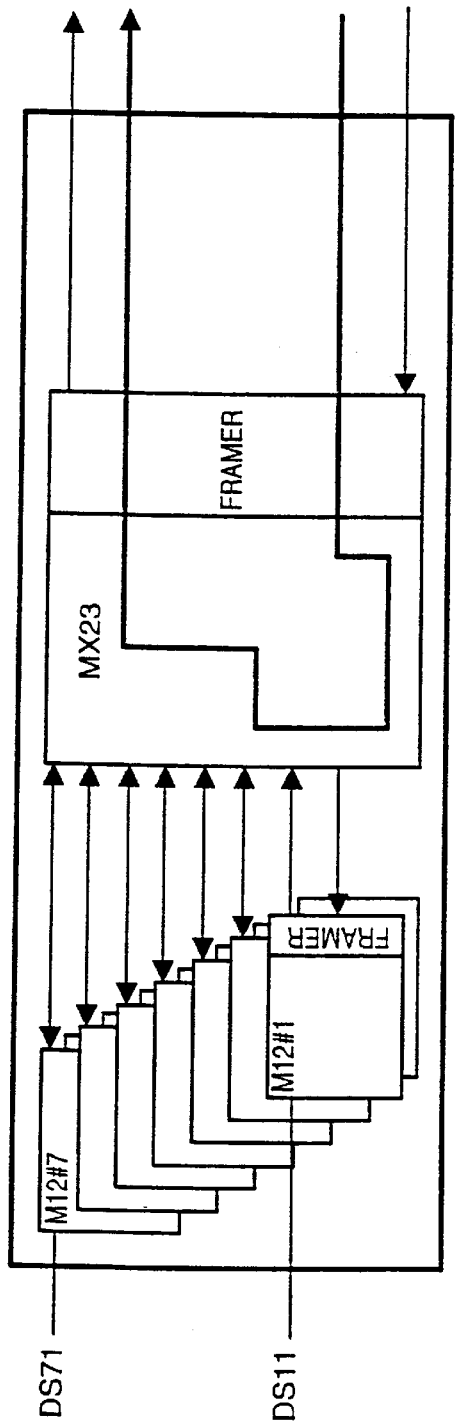
Fig. 17
Fig. 18

TELECOMMUNICATIONS MULTIPLEXER

This application is a divisional of application Ser. No. 08/962,757 filed on Nov. 3, 1997, now U.S. Pat. No. 5,991,312.

The present invention relates to an improved multiplexer for use with telecommunications circuits, and in particular, to a multiplexer that includes functionality to automatically and quickly switch between internal components that are in-use and spare internal components based upon detected malfunctions, to a multiplexer with novel architecture to allow it to be packaged in a smaller volume, and to a multiplexer that can be externally controlled via a computer network.

BACKGROUND OF THE INVENTION

Modern telecommunication circuits, such as telephone systems, rely on multiplexing to pack more information onto a single wire or cable. Such systems typically employ time-division multiplexing which takes small time slices of each of many different signals and sequentially packs these time slices together to form a higher-rate multiplexed signal.

For example, modern telephone systems convert speech in a telephone signal into a digital data stream having 64,000 bits per second (64 kbps). Such data streams are known in the telecommunications industry as Digital Service, Level 0 (or DS-0). A simple multiplexer can take small time slices (or frames) of 24 different DS-0 data streams (from 24 phone lines) and combine these time slices sequentially into a higher rate data stream of 1,544,000 bits per second (1.544 Mbps), which is known as Digital Service, Level 1 (or DS-1). Note that 1.544 Mbps is slightly greater than 24 multiplied by 64 kbps, to accommodate the addition of synchronization or framing bits. A DS-1 signal is normally carried on a T-1 digital transmission link, which typically includes two pairs of twisted wires. One twisted wire pair carries a DS-1 signal in one direction and one twisted wire pair carries a DS-1 signal in the opposite direction.

In a similar fashion, multiple DS-1 signals are multiplexed together to form even higher rate signals. For example, 28 DS-1 signals can be multiplexed together to form a higher rate data stream of 44,736,000 bits per second (44.736 Mbps), which is known as Digital Service, Level 3 (or DS-3). Note that 44.736 Mbps is slightly greater than 28 multiplied by 1.544 Mbps, to accommodate the addition of framing bits. A DS-3 signal is carried on a T-3 digital transmission link, which may typically include a pair of copper coaxial cables, although fiber optic or RF transmission systems can be used as well. Since each DS-1 signal may carry 24 different telephone conversations, each DS-3 signal may contain 672 different telephone conversations.

Multiplexing devices for converting between DS-1 signals and DS-3 signals have been in use for some time now and are commonly referred to as M1-3 multiplexers. Unfortunately, most of the Me-3 multiplexers in use today are based on technology from the late 1970's. Further, the Me-3 multiplexers currently being marketed are not very different from those older Me-3 multiplexers still in use. Specifically, Me-3 devices are generally large in volume and weight. Telecommunication equipment is oftentimes mounted in vertical racks having a width of either 19 or 23 inches. Within these racks, a vertical space of 1.75 inches is typically provided in which to install a given piece of equipment. This space is known as a "rack unit" or (RU). Older M1-3 devices may have required up to 2 feet of vertical space on the rack, or 8 RUs. Modern M1-3 devices are typically at least 3 RUs tall. With the proliferation of increasingly sophisticated telecommunications equipment and the distribution of same to customers' premises (M1-3 devices may now be installed on-site at large corporations), it is desirable to significantly decrease the volume of space used by each device, such as an M1-3 device. Radically different designs may be required to achieve such a decrease in volume.

Another issue with M1-3 devices is their ability to perform self-tests and assist in testing of the telecommunications equipment to which it interfaces. As can be appreciated, when a device impacts as many telephone lines as an M1-3 device does, and with the increased reliance on telephone lines to transfer digital data between computers, the proper operation of the telecommunications equipment is of paramount importance. One form of network testing includes generating a signal including a pseudorandom bit sequence (PRBS) at one location in a telecommunications circuit, receiving the PRBS at another location in the circuit, and comparing the received signal to the expected signal to determine the accuracy with which the signal was propagated through the circuit. This accuracy is typically expressed in terms of a bit error rate (BER). Particular sections or components of a telecommunications circuit can be fault-isolated through a technique known as "loopback." A loopback is a temporary condition in which an outgoing signal is reflected back as an incoming signal to isolate one section of the telecommunications circuit so that more specific detection can be made of the malfunctioning equipment. The ability of current M1-3 devices to perform such network tests and loopbacks has been limited. Specifically, it is believed that current M1-3 devices cannot generate or detect a PRBS to test the network or any portion thereof. In addition, current M1-3 devices cannot create loopbacks (or detect loopback codes) to facilitate testing. In order to interface with the low speed network on one side of an M1-3 device, it is typically necessary to use 28 different network interface units (NIU), one for each T-1 line. These NIUs are able to detect loopback codes sent on the T-1 lines and perform the loopback function by routing the receive signal to the transmit signal path in response to the loopback codes. In addition, different types of NIUs are available for performing a similar function on the T-3 side of M1-3 devices. Thus, a total of 29 different NIUs may typically be used with an M1-3 device.

Because of the number of telephone calls which may be simultaneously routed through an M1-3 device, and because of the remote locations where M1-3 devices may be installed, it is desirable for M1-3 devices to have the functionality to remain operational even when certain internal components and/or external equipment have failed. For this reason, M1-3 devices have some redundant or spare components provided therein which may be automatically switched in to replace the failed components. Typically, the spare component is switched in for the failed component via electro-mechanical relays. Because of the mechanical aspects of relays, the transition may take as long as 5 milliseconds to complete. At DS-1 rates of 1.544 Mbps, this transition time may be tolerable, but at DS-3 rates of 44.736 Mbps this transition time will cause an unacceptable amount of errors and will create alarms undesirably. It would be preferable to have an M1-3 device which did not set off alarms when switching in/out DS-3 level equipment. Such a device would be said to have "hitless" transitions if no alarms were set off. Of course, even with hitless transitions, there would be some small number of errors and loss of data, but not a sufficient amount to set off alarms per the applicable regulatory specifications.

In the DS-1 portion of most M1-3 devices, there are a plurality of circuit cards to interface with the 28 T-1 lines of the low speed network communicating to the M1-3 device. Each of these circuit cards may include sufficient interface electronics for 4 of the T-1 lines, meaning that 7 circuit cards may be needed for the 28 T-1 lines. A redundant or spare circuit card may be provided with sufficient interface electronics to interface with 4 T-1 lines. Some M1-3 devices allow the spare card to be switched in to replace one of the afore-mentioned 7 cards if a failure is detected. If, however, there is a failure in one set of interface electronics on one card and in another set on another card this system will not provide sufficient redundancy to allow the M1-3 device to remain completely operational.

In addition, it is believed that current M1-3 devices do not internally provide for network redundancy without additional external equipment such as a network interface unit. Network redundancy allows the telecommunications system to continue to operate even when a T-3 communications link fails. To provide this redundancy, systems may provide two T-3 links on diverse routes. For example, one T-3 link may be via through-the-air RF transmission, while a second T-3 link may be via an underground copper coaxial cable. This route diversity decreases the likelihood of a simultaneous failure in both links. Current M1-3 devices must be attached to an external network interface unit in order to interface with or connect to more than one T-3 communications link.

Another issue with telecommunications equipment is the desired ability to have equipment which can be monitored and controlled externally via a computer network when desired. To the best of applicants' knowledge, the only prior and current M1-3 devices which can be externally monitored or controlled can be done so only via a dedicated computer or terminal.

It is against this background and the desire to solve the problems of the prior art that the present invention has been developed.

SUMMARY OF THE INVENTION

Accordingly, it is an object of the present invention to provide an improved multiplexer device which is significantly smaller and lighter than current comparable devices.

It is also an object of the present invention to provide an improved multiplexer device which has an increased ability to perform self-tests and assist in fault isolation.

It is further an object of the present invention to provide an improved multiplexer device which can automatically switch out malfunctioning equipment for functional equipment with a minimum of data loss.

It is still further an object of the present invention to provide an improved multiplexer device which can operate in a standalone mode or be controlled externally via a computer network.

It is yet further an object of the present invention to provide an improved multiplexer device which incorporates the functionality normally contained in a network interface unit.

It is yet further an object of the present invention to provide an improved multiplexer device in which a spare card for a plurality of interface cards could simultaneously serve as a spare for more than one interface card.

Additional objects, advantages and novel features of this invention shall be set forth in part in the description that follows, and in part will become apparent to those skilled in the art upon examination of the following specification or may be learned by the practice of the invention. The objects and advantages of the invention may be realized and attained by means of the instrumentalities, combinations, and methods particularly pointed out in the appended claims.

To achieve the foregoing and other objects and in accordance with the purposes of the present invention, as embodied and broadly described therein, the present invention is directed to a multiplexer device for telecommunications circuits for multiplexing and demultiplexing signals between a plurality of relatively lower speed telecommunication circuits and at least one relatively higher speed telecommunication circuit. The multiplexer device includes a multiplexer and a plurality of in-use cards, each card including a plurality of interface circuits, each interface circuit being connectable to one of the plurality of relatively lower speed telecommunication circuits and for supplying and receiving relatively lower speed data signals to and from the multiplexer. The device also includes a spare card with a plurality of interface circuits, with each of the plurality of interface circuits being connectable to the plurality of in-use cards for selective replacement of selected ones of the interface circuits of selected ones of the in-use cards with selected ones of the interface circuits of the spare cards, at the same time that others of the interface circuits of the spare card are connectable to the plurality of in-use cards for selective replacement of selected ones of the interface circuits of selected other ones of the in-use cards with selected ones of the interface circuits of the spare cards, for supplying and receiving relatively lower speed data signals to and from the multiplexer when the spare card is selected.

There may be seven in-use cards with each having four interface circuits thereon, and wherein the spare card has four interface circuits thereon with the spare card connected to the in-use cards such that the spare card can completely replace one of the in-use cards or the interface circuits on the spare card can replace at least one of the interface circuits on up to four of the in-use cards. The spare card may have loopback circuits provided thereon, the loopback circuits being selectable in place of the interface circuits on the spare card, to allow selected ones of the relatively lower speed telecommunications circuits to be looped back onto themselves. The loopback circuits may include metallic loopback circuits.

The present invention is also directed to a multiplexer device for telecommunications circuits for multiplexing and demultiplexing signals between a plurality of relatively lower speed telecommunication circuits and a relatively higher speed telecommunication circuit, the relatively higher speed telecommunication circuit being connectable to the multiplexer device through one or more telecommunications links. The multiplexer device includes a primary multiplexer circuit that can be selectively electronically enabled or disabled to place the circuit in or out of an operational configuration and a secondary multiplexer circuit that can be selectively electronically enabled or disabled to place the circuit in or out of an operational configuration. The multiplexer device also includes a controller communicating with the primary and secondary multiplexer circuits and an interface to at least one of the telecommunication links between the multiplexer and the relatively higher speed telecommunication circuit. The controller monitors the operational status of the primary and secondary multiplexer circuits and selectively electronically enables one of the primary and secondary multiplexer circuits and disables the other of the primary and secondary multiplexer circuits based on the monitoring.

There may be two telecommunications links, each one attached to a different one of the primary and secondary multiplexer circuits. A given one of the two telecommunication links may be selectively and alternatively attached to either one of the primary and secondary multiplexer circuits.

The present invention is also directed to a multiplexer device for telecommunications circuits for multiplexing and demultiplexing signals between a plurality of relatively lower speed telecommunication circuits and a relatively higher speed telecommunication circuit, the relatively higher speed telecommunication circuit being connectable to the multiplexer device through one or more telecommunications links. The multiplexer device includes a primary multiplexer circuit that can be selected or deselected to place the circuit in or out of an operational configuration and a secondary multiplexer circuit that can be selected or deselected to place the circuit in or out of an operational configuration. The device also includes a controller communicating with the primary and secondary multiplexer circuits and an interface to at least one of the telecommunication links between the multiplexer and the relatively higher speed telecommunication circuit. The controller monitors the operational status of the primary and secondary multiplexer circuits and selects one of the primary and secondary multiplexer circuits and deselects the other of the primary and secondary multiplexer circuits based on the monitoring, the transition time between one of the multiplexer circuits being in an operational configuration and the other of the multiplexer circuits being in an operational configuration being sufficiently small to be a hitless transition.

The present invention is also directed to a multiplexer device for telecommunications circuits for multiplexing and demultiplexing signals between a plurality of relatively lower speed telecommunication circuits and a relatively higher speed telecommunication circuit, the relatively higher speed telecommunication circuit being connectable to the multiplexer device through at least two different telecommunications links. The multiplexer device includes a primary multiplexer circuit that can be selected or deselected to place the circuit in or out of an operational configuration and a secondary multiplexer circuit that can be selected or deselected to place the circuit in or out of an operational configuration. The device also includes an interface to the two telecommunication links between the multiplexer and the relatively higher speed telecommunication circuit, the interface allowing a selected one of the multiplexer circuits to be connected to a selected one of the telecommunications links and the other of the multiplexer circuits to be connected to the other of the telecommunications links. The device also includes a controller communicating with the primary and secondary multiplexer circuits and the interface. The controller monitors the operational status of the primary and secondary multiplexer circuits and the two telecommunications links and selects one of the primary and secondary multiplexer circuits and one of the telecommunication links and deselects the other of the primary and secondary multiplexer circuits and the telecommunications links based on the monitoring.

The present invention is also directed to a multiplexer device for telecommunications circuits for multiplexing and demultiplexing signals between cabling from a plurality of relatively lower speed telecommunication circuits and from at least one relatively higher speed telecommunication circuit. The multiplexer device includes a plurality of interface circuit cards, each having a plurality of relatively lower speed interface circuits thereon to interface with the relatively lower speed telecommunication circuits. The device also includes a multiplexer circuit card having components thereon for performing the multiplexing and demultiplexing. The device also includes a backplane assembly into which the interface circuit cards and the multiplexer cards are connectable and into which the cabling from the plurality of relatively lower speed telecommunication circuits and the at least one relatively higher speed telecommunication circuit are connectable, the backplane assembly including at least two separate backplanes, including an internal backplane and an external backplane, which are connected together so that the two backplanes are in a parallel and juxtaposed relationship, the internal backplane being mechanically and electrically connected to the interface circuit cards, to the multiplexer card, and to the external backplane, the external backplane being mechanically and electrically connected to the internal backplane and to the cabling from the plurality of relatively lower speed telecommunication circuits and the at least one relatively higher speed telecommunication circuit.

The present invention is also directed to a multiplexer device for telecommunications circuits for multiplexing and demultiplexing signals between cabling from a plurality of relatively lower speed telecommunication circuits and from at least one relatively higher speed telecommunication circuit, the multiplexer device being externally controllable by an external controller on a computer network to which it may be connected. The device includes a multiplexer and a plurality of interface circuits interfacing between the plurality of relatively lower speed telecommunication circuits and the multiplexer and between the at least one relatively higher speed telecommunication circuit and the multiplexer. The device also includes an internal controller communicating with and controlling the multiplexer and the interface circuits and an external connector connected to the internal controller and connectable to the computer network with the external controller being a part of the computer network, the external connector allowing the external controller to communicate with the internal controller through the computer network. The external controller can indirectly control the multiplexer and interface circuits through the internal controller.

The computer network may include an Ethernet connection.

The present invention is also directed to a multiplexer device for telecommunications circuits for multiplexing and demultiplexing signals between cabling from a plurality of relatively lower speed telecommunication circuits and from at least one relatively higher speed telecommunication circuit. The multiplexer device includes a device housing and a dual backplane connected to the device housing, the dual backplane including two separate backplanes, an internal backplane and an external backplane, which are connected together so that the two backplanes are in a parallel and juxtaposed relationship. The device also includes a plurality of interface circuit cards, each having a plurality of relatively lower speed interface circuits thereon to interface with the relatively lower speed telecommunication circuits, the interface circuit cards being receivable within the housing and being mechanically and electrically connectable to the dual backplane, one of the interface circuit cards being a spare card that can be selectively selected to replace one of the other interface circuit cards without physically moving the spare card The device also includes a primary and a secondary multiplexer circuit card, each having components thereon for performing the multiplexing and demultiplexing, each multiplexer card being receivable within the housing and being mechanically and electrically connectable to the dual backplane, wherein either of the primary or the secondary multiplexer circuit cards can be selected to perform the multiplexing and demultiplexing. The interface circuit cards and the multiplexer cards are connectable into the dual backplane and the cabling from the plurality of relatively lower speed telecommunication circuits and the at least one relatively higher speed telecommunication circuit are connectable to the dual backplane, the internal backplane being mechanically and electrically connected to the interface circuit cards, to the multiplexer card, and to the external backplane, the external backplane being mechanically and electrically connected to the internal backplane and to the cabling from the plurality of relatively lower speed telecommunication circuits and the at least one relatively higher speed telecommunication circuit.

The present invention is also directed to a multiplexer device for telecommunications circuits for multiplexing and demultiplexing signals between a plurality of relatively lower speed telecommunication circuits and at least one relatively higher speed telecommunication circuit, wherein the relatively lower speed telecommunication circuits carry data which can include loopback codes requesting the reflection back of a transmit portion of the relatively lower speed telecommunication circuit, as viewed by the circuit, into a receive portion of the relatively lower speed telecommunication circuit. The multiplexer device includes a multiplexer and a plurality of interface circuits, each interface circuit being connectable to one of the plurality of relatively lower speed telecommunication circuits and for supplying and receiving relatively lower speed data signals to and from the multiplexer, each interface circuit including a detector to detect loopback codes in the data passed through the relatively lower speed telecommunications circuit and including a loopback circuit that can be selectively switched in to reflect the transmit portion from the relatively lower speed telecommunications circuit back to the receive portion of the relatively lower speed telecommunications circuit in response to the detection of a loopback code.

Any of the interface circuits may switch in its loopback circuit independently of the remaining interface circuits. The loopback codes may include loop-up and loop-down codes. The interface circuits also may include a loopback code generator to generate loopback codes as desired to cause loopbacks to be created in the relatively lower speed telecommunication circuits to reflect data back toward the multiplexer device.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention. In the Drawings:

FIG. 14 is a simplified block diagram of portions of the multiplexer device of FIG. 1, showing a DSX-1 line loopback mode.

FIG. 15 is a simplified block diagram of portions of the multiplexer device of FIG. 1, showing a DSX-1 equipment loopback mode.

FIG. 17 is a simplified block diagram of portions of the multiplexer device of FIG. 1, showing a DS-3 line loopback mode.

FIG. 18 is a simplified block diagram of portions of the multiplexer device of FIG. 1, showing a DS-3 payload loopback mode.

DETAILED DESCRIPTION OF THE PREFERRED EMBODIMENTS

Figure 1:
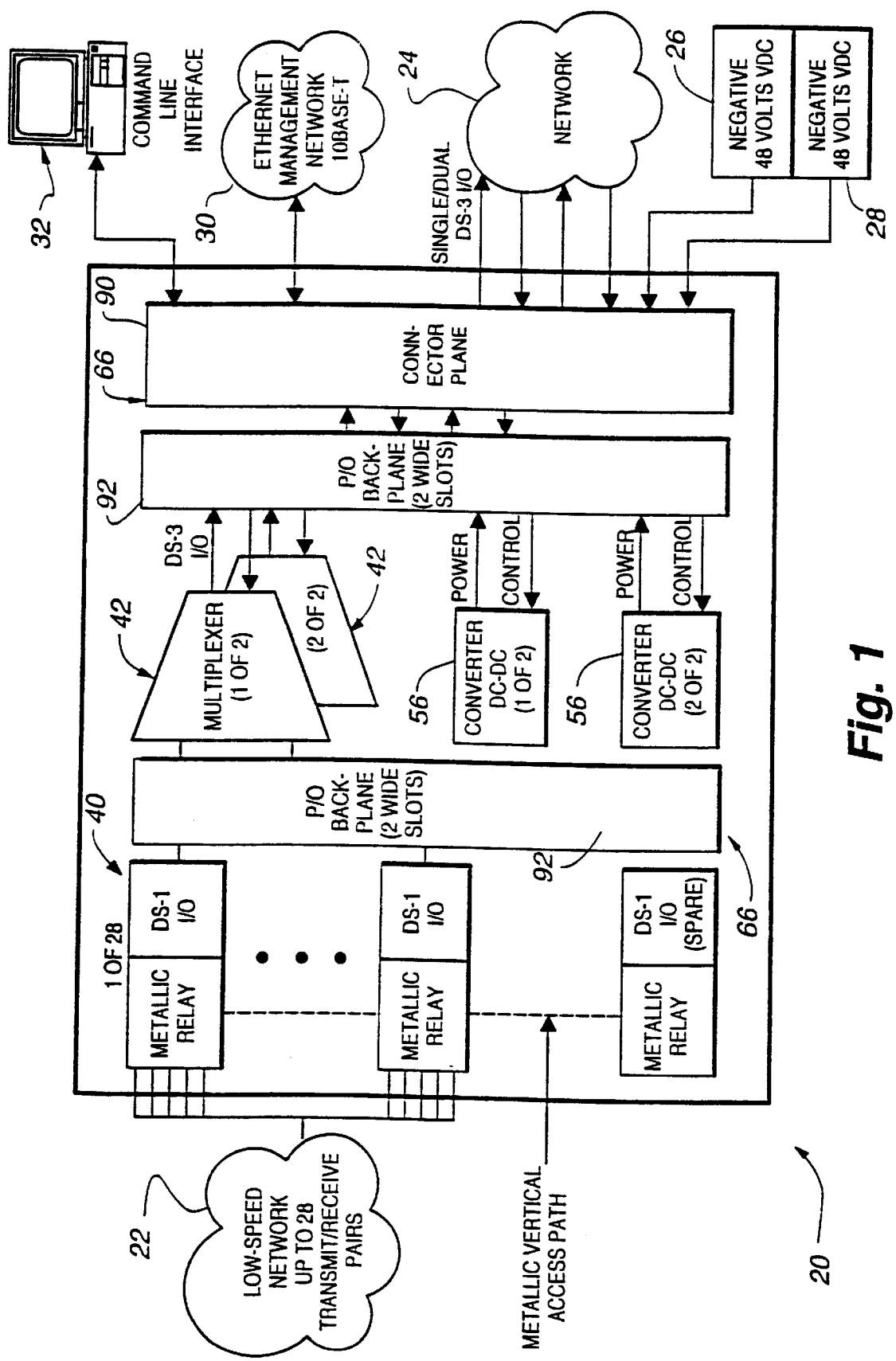
FIG. 1 is a block diagram of a multiplexer device of the present invention.

As shown in FIG. 1, a multiplexer device 20 is used to interface between a slow-speed network 22 (such as twenty-eight transmit/receive pairs of DSX-1 signals) and a high-speed network 24 having at least one transmit/receive pair of DS-3 signals. The multiplexer device 20 receives power from one or both of a pair of power sources 26 and 28. The multiplexer device 20 is optionally connectable to a computer network 30 and/or to a computer terminal 32 for external control and/or monitoring of the multiplexer device 20.

Figure 2A:
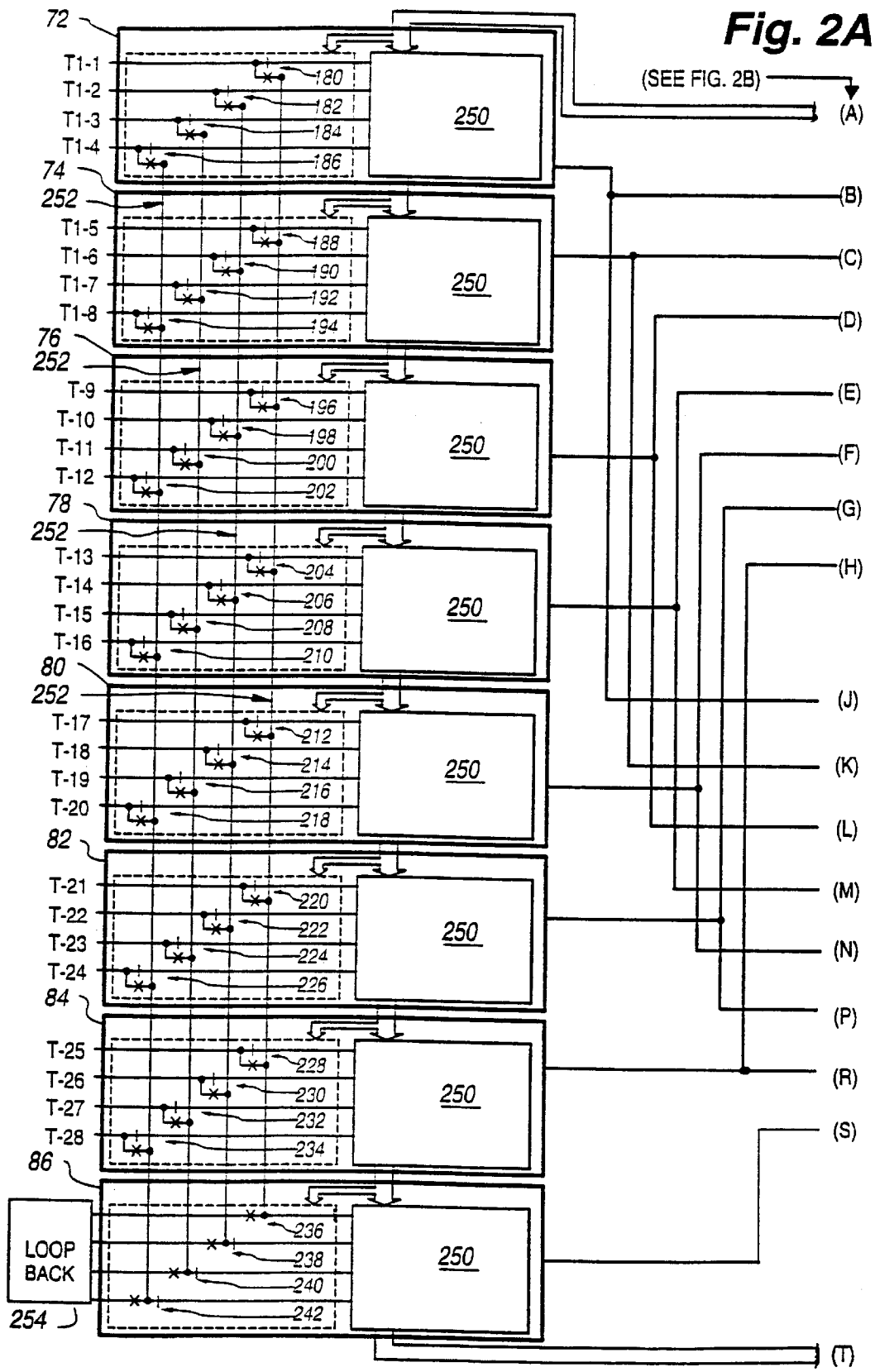
FIGS. 2a and 2b are a more detailed block diagram of the multiplexer device of FIG. 1.
Figure 2B:
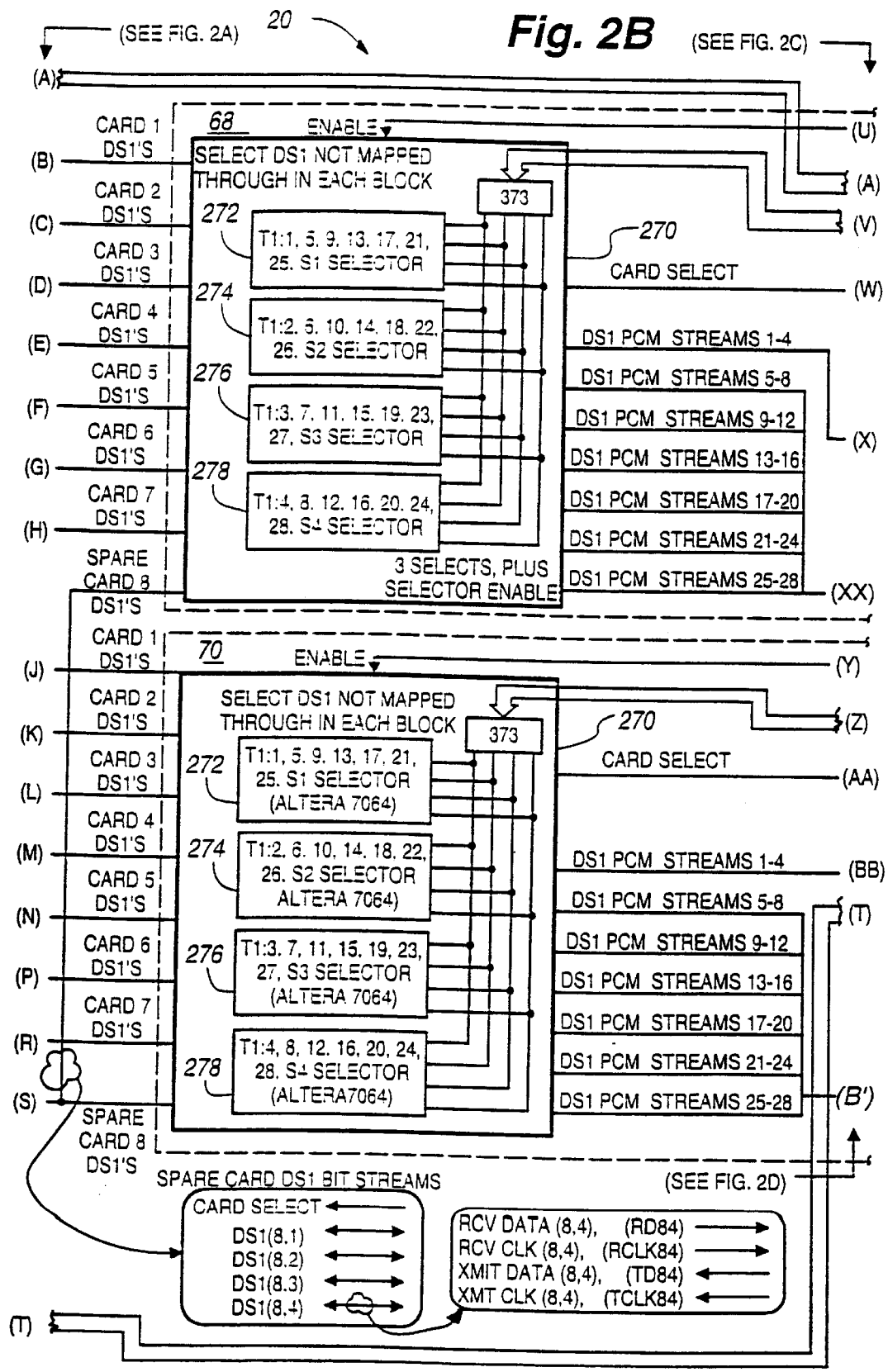
Figure 2C:
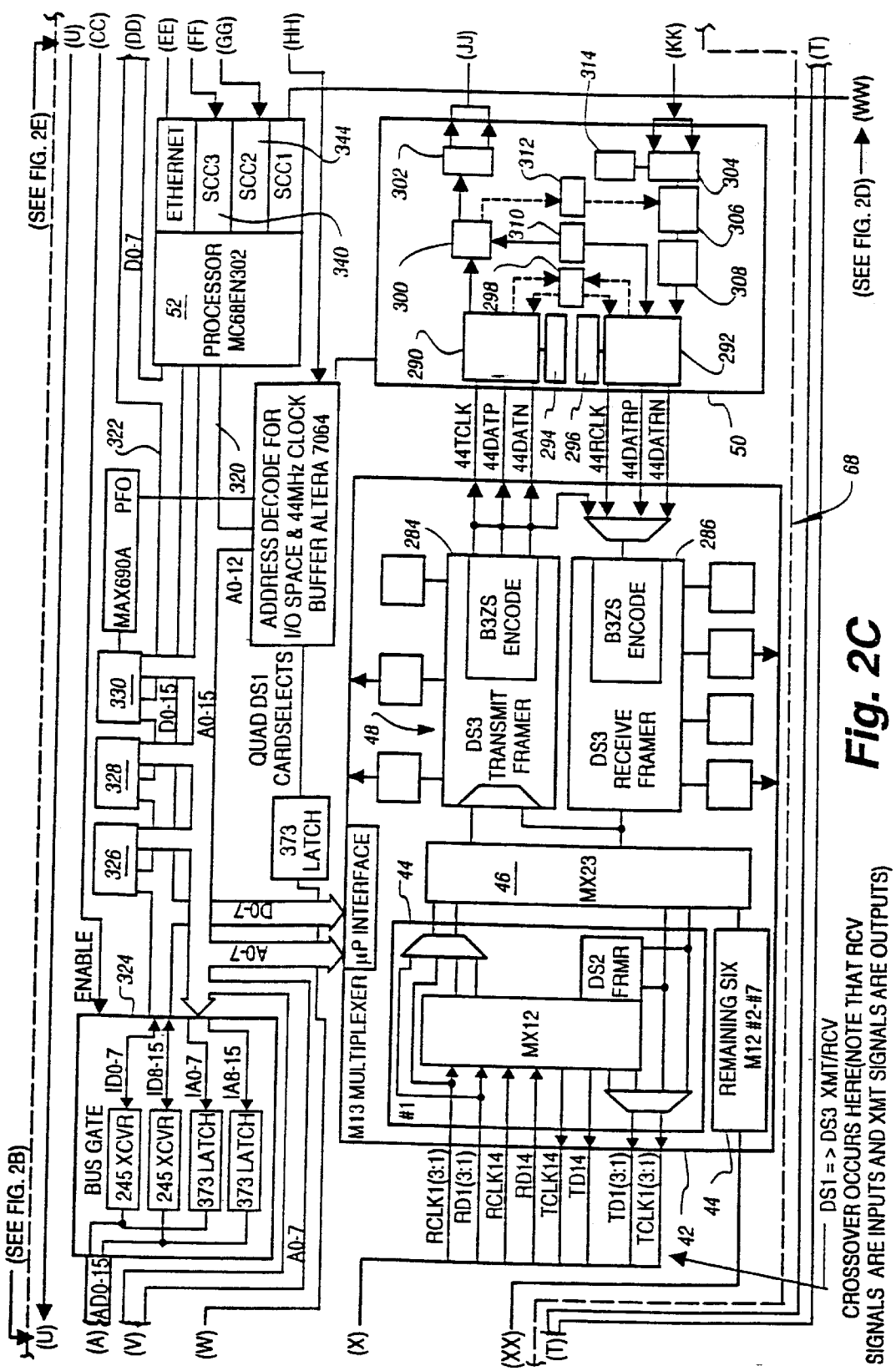
Figure 2D:
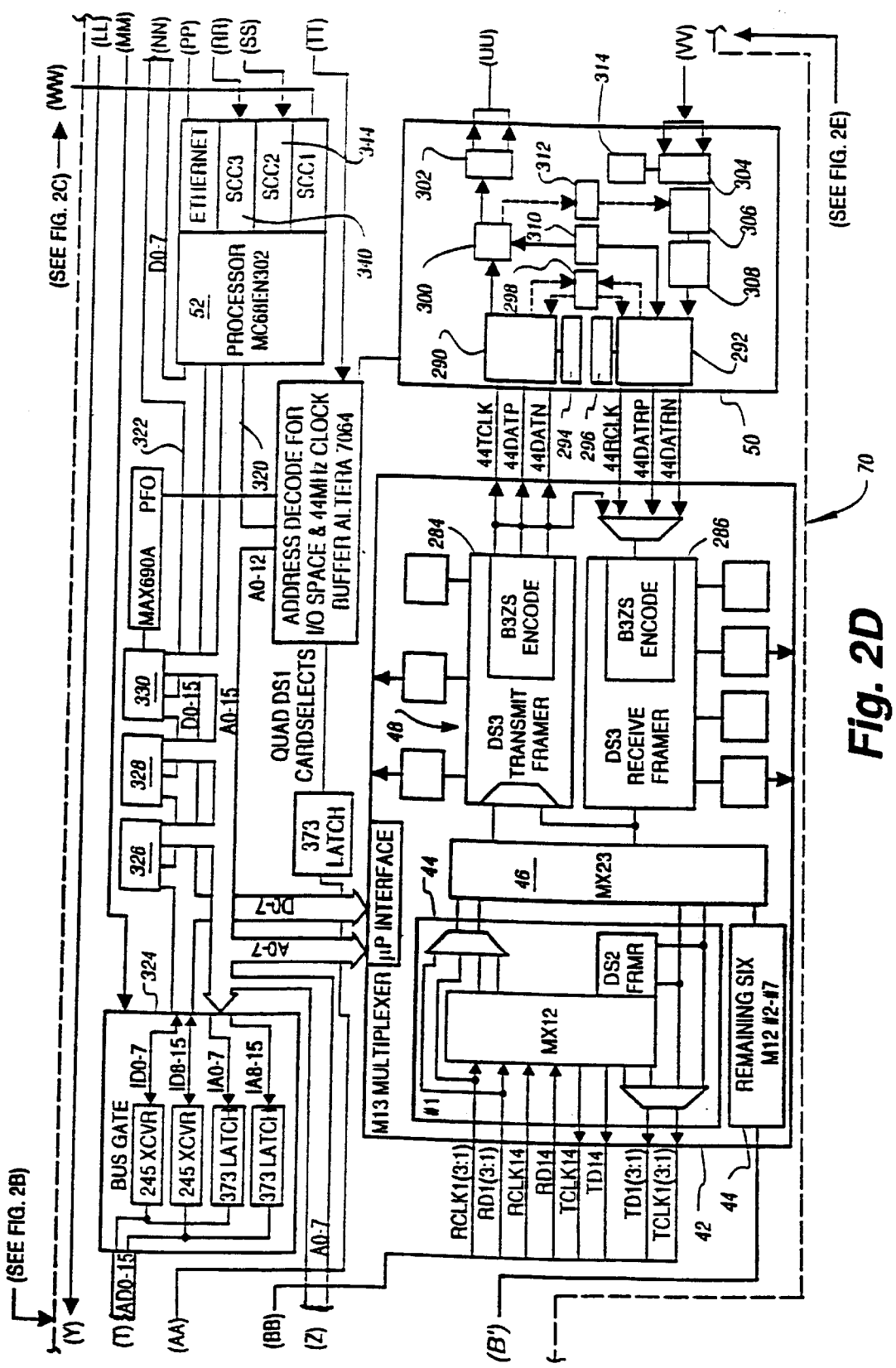
Figure 2E:
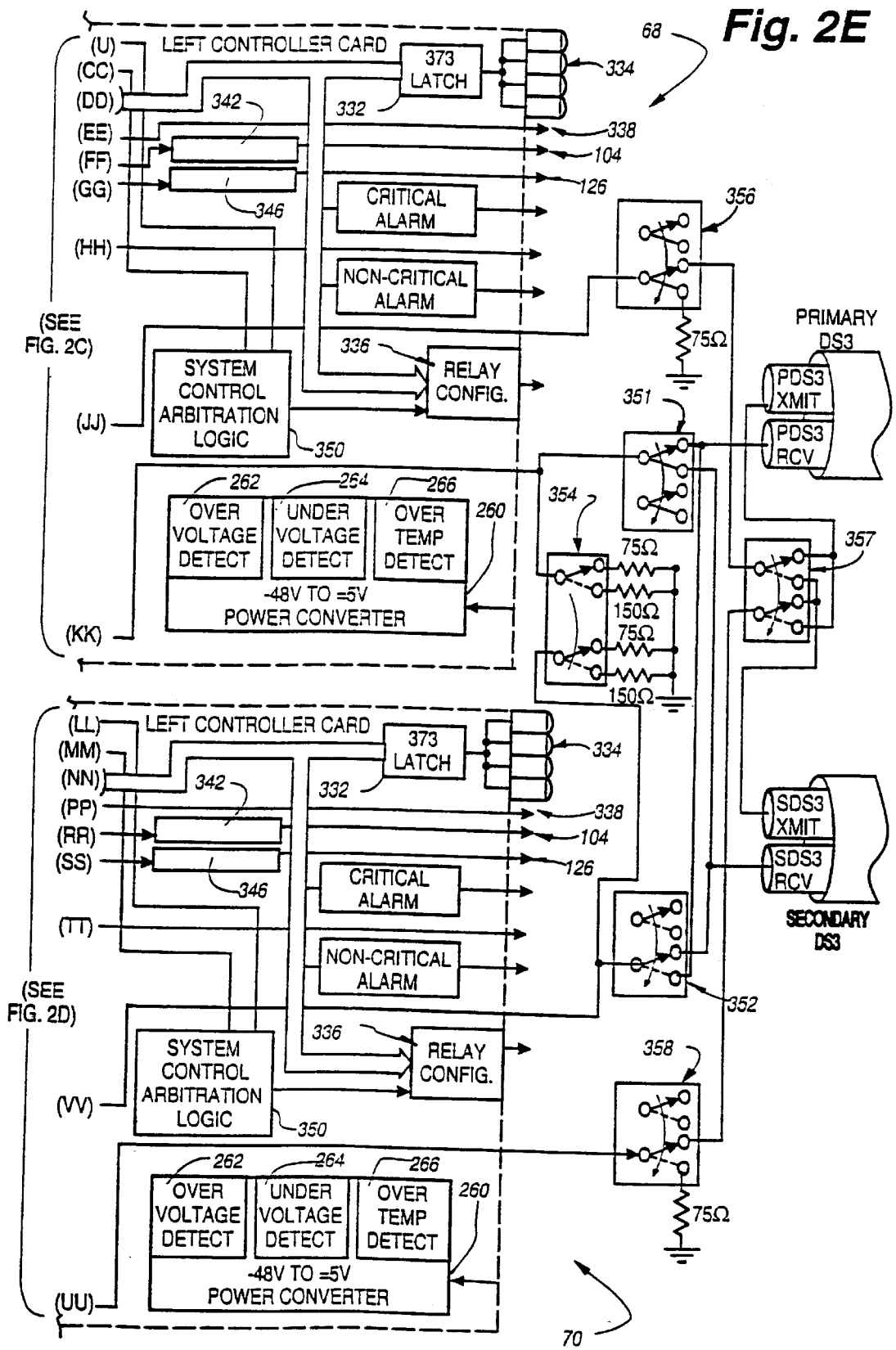

The multiplexer device 20 includes a DSX-1 I/O circuit 40 for interfacing the multiplexer device 20 to the low speed network 22, as shown in FIGS. 2A and 2B. A separate DSX-1 I/O circuit 40 is provided for each of the DSX-1 signals in the low-speed network 22. Also, in the multiplexer device 20 are a pair of controller cards 68 and 70, each having multiplexer circuits 42 which convert between the DSX-1 signals from the DSX-1 I/O circuits 40 and the DS-3 signals of the high-speed network 24. Each multiplexer circuit 42 includes an M1-2 multiplexer 44 which converts between DSX-1 and DS-2 signals and an M2-3 multiplexer 46 which converts between DS-2 and DS-3 signals. The multiplexer circuits 42 include framers 48 to place and retrieve the DS-2 data into and out of DS-3 frames of data. The framers 48 are attached to a transceiver 50 which receives and transmits the DS-3 signal to the high-speed network 24. A pair of microprocessors 52 are provided, one for each multiplexer circuit 42, for control thereof. The two microprocessors 52 are in communication with each other so as to determine which of the pair of controller cards 68 and 70 are receiving and transmitting data to and from the high-speed network 24 at any given time. Each of the controller cards 68 and 70 are primarily made up of the multiplexer circuit 42, the framers 48, the transceiver 50, and the microprocessor 52. Each of the controller cards 68 and 70 also includes a power converter 56 thereon for converting –48 Volt DC power to +5 Volt DC power The multiplexer device 20 is housed in a housing enclosure 60 which includes a bottom member 62 having sides formed thereon and a housing cover 64 which fits over the bottom member 62 and attaches thereto to complete the housing enclosure 60. As can be seen in the exploded view of FIG. 3, the housing enclosure 60 encloses a dual backplane 66, the pair of controller cards 68 and 70, and eight DSX-1 interface cards 72, 74, 76, 78, 80, 82, 84, and 86 therein.

Figure 3:
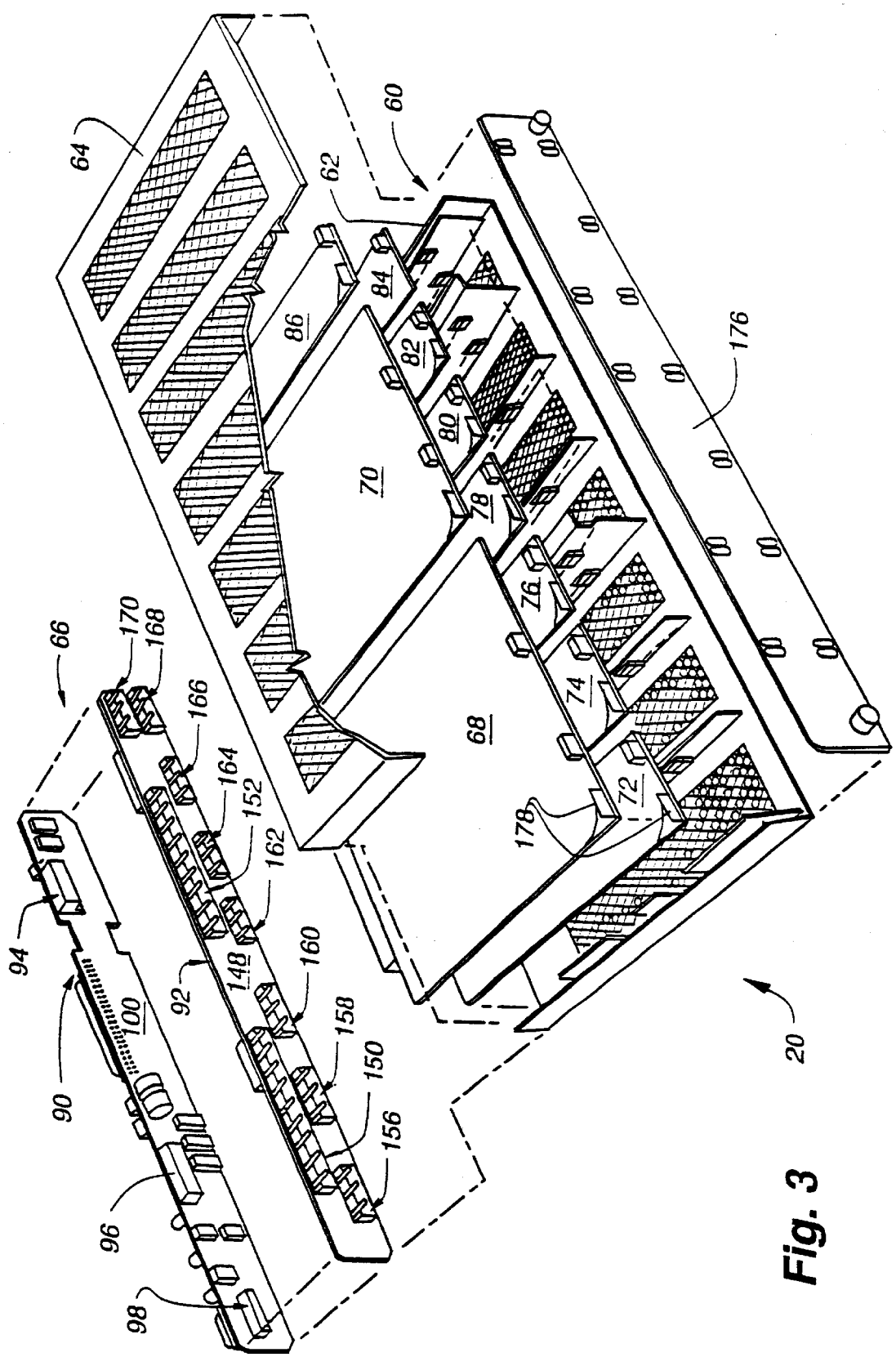
FIG. 3 is a perspective exploded view of the multiplexer device of FIG. 1.
Figure 4:
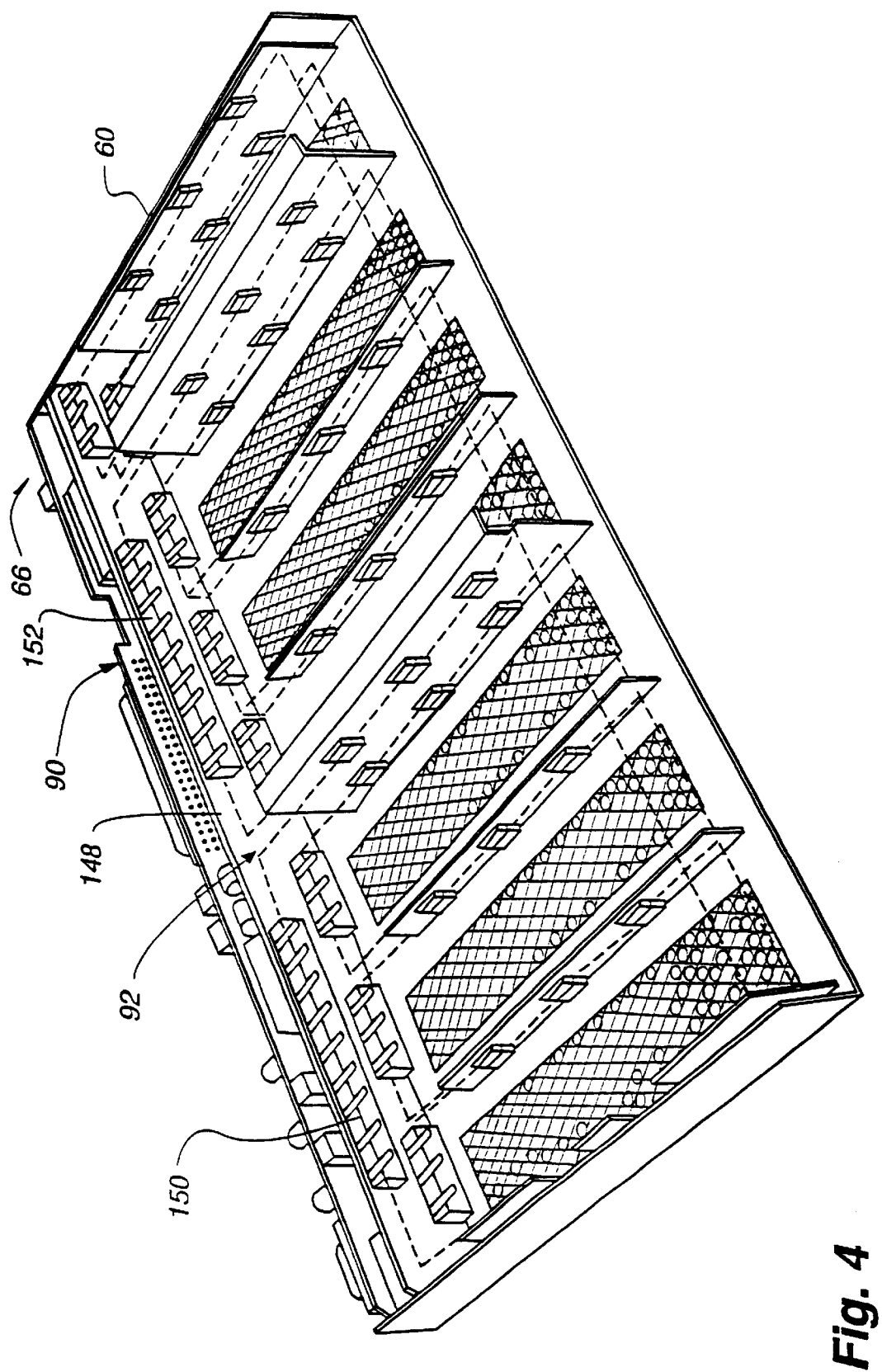
FIG. 4 is a perspective view of a bottom member of a housing enclosure of the multiplexer device of FIG. 1, showing a dual backplane installed therein.
Figure 6:
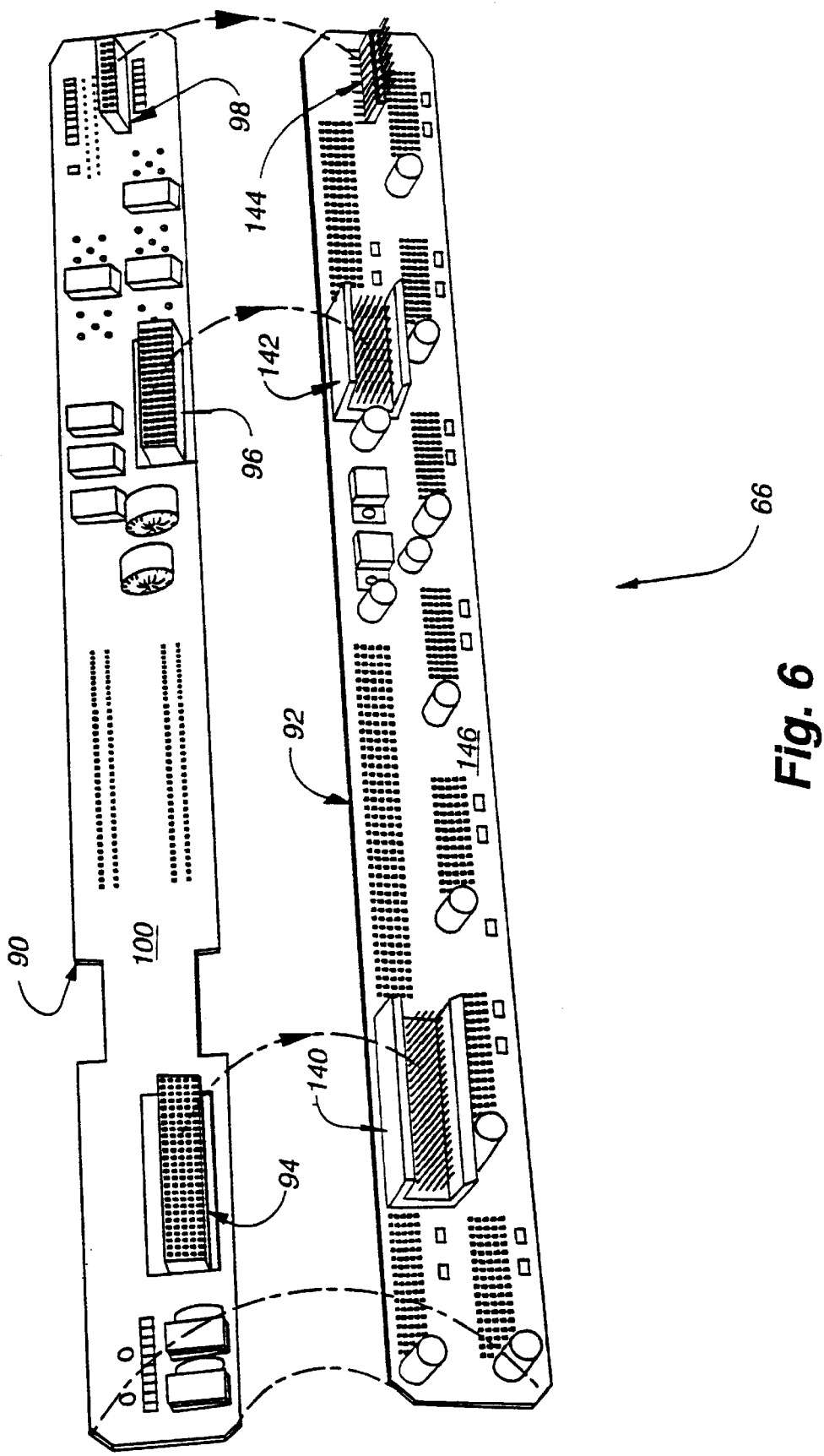
FIG. 6 is a perspective view of the dual backplane of FIG. 4 showing an internal backplane disconnected from the external backplane.

The dual backplane 66 includes two separate backplanes, an external backplane 90 and an internal backplane 92, as shown in FIGS. 3 and 6. The external backplane 90, also known as the connector plane, is preferably a six-layer circuit board with three large mating connectors 94, 96, and 98, for electrically and mechanically connecting to the internal backplane. These connectors 94, 96, and 98 to the internal backplane 92 are located on an interior side 100 of the external backplane 90. Each of the connectors 94, 96, and 98 have pins associated therewith which extend through holes in the external backplane 90 to mate with various leads in the six-layer board of the external backplane 90.

Figure 5:
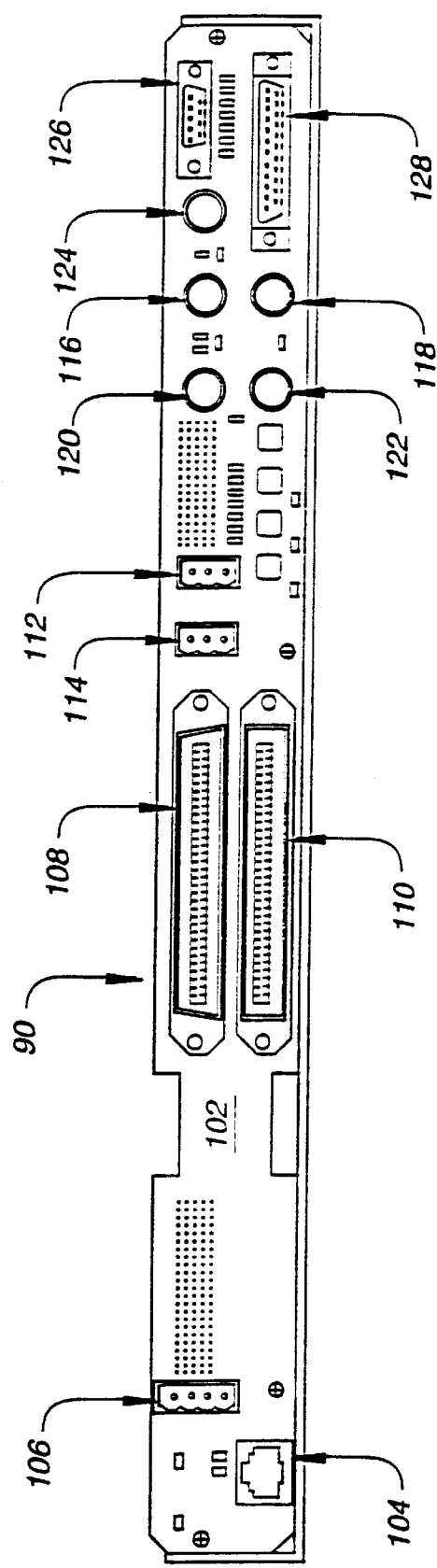
FIG. 5 is a rear elevation view of an external backplane of the dual backplane of FIG. 4.

On an exterior side 102 of the external backplane 90 are a plurality of external connectors for connecting to equipment external to the multiplexer device 20, as best seen in FIG. 5. An RJ-45 10BaseT connector 104 is provided for Ethernet connectivity. A four-pin alarm connector 106 is provided for external monitoring of major and minor alarms created by the multiplexer device 20 and for additional functionality related thereto. A pair of 64-pin connectors 108 and 110 are provided for attachment of the ring and tip leads of the DSX-1 connections from the low-speed network 22. The connectors 108 and 110 are of opposite gender, the transmit or outgoing connector 108 being of male gender and the receive or incoming connector 110 being of female gender. A pair of three-pin power input connectors 112 and 114 are provided for attachment to the external power sources 26 and 28, respectively. A pair of BNC connectors 116 and 118 are provided for attachment to the coaxial cables of the T-3 line coming from the high-speed network 24. The BNC connectors 116 and 118 are for attachment for the primary T-3 line from the high speed network 24, while another pair of BNC connectors 120 and 122 are for attachment to a secondary T-3 line which may be available from the high-speed network 24. BNC connectors 116 and 120 are input or receive connectors for receiving DS-3 signals from the high-speed network 24, while connectors 118 and 122 are output or transmit connectors for outputting DS-3 signals to the high-speed network 24. Another BNC connector 124 is provided for attachment to an external 44 megahertz (MHz) clock which may be provided. A 9-pin standard RS-232 Async serial computer connector 126 is provided. A 25-pin standard computer connector is provided as a sync port. The external backplane 90 also includes a variety of electronic components mounted directly thereon such as resistors, transformers, relays, diodes, inductors, capacitors, and LEDs.

The connectors 94, 96, and 98 to the internal backplane are the female or receptacle portions thereof which mate with male portions 140,142, and 144 on the internal backplane. Together, these connectors are push-pin connectors so that the pins of connectors 140, 142, and 144, when properly aligned with the receptacle connectors 94, 96, and 98 can be carefully inserted therein. The connector pair 94 and 140 is a 120-pin connector, the connector pair 96 and 142 is a 90-pin connector, and the connector pair 98 and 144 is a 20-pin connector. The internal backplane 92 has the aforementioned connectors 140, 142, and 144 on an exterior side 146 thereof along with several discrete components including resistors, capacitors, inductors, and diodes. On an interior side 148 of the internal backplane 92 there are provided a pair of 270-pin female connectors 150 and 152 for connection of the two controller cards 68 and 70. Also located on the interior side 148 of the internal backplane 92 are eight 90-pin female connectors 156, 158, 160, 162,164,166, 168, and 170 for connection to the eight DSX-1 cards 72, 74, 76, 78, 80, 82, 84, and 86.

Preferably, the internal backplane 92 is a sixteen-layer circuit board. As can be appreciated, by separating the backplane 66 into two separate backplanes 90 and 92, the connectivity to the external equipment and to the internal components such as the controller cards 68 and 70 and the DSX-1 cards 72, 74, 76, 78, 80, 82, 84, and 86 can be achieved with a minimum of two-dimensional space, thus reducing the overall height of the multiplexer device 20. Because surface mount connectors are not available in this density and because of the need to locate electronic components directly on the backplane 66, it would not be possible to have a single backplane with the connectors to the controller cards and DSX-1 cards on one side and connectors to the external equipment at a corresponding position on the other side thereof. For this reason, with a single backplane it would be necessary to have a much larger two-dimensional area for the backplane, thus increasing the height and/or width of the multiplexer device 20.

The bottom member 62 of the housing enclosure 60 includes guide rails formed thereon to support and guide the controller cards 68 and 70 and the DSX-1 cards 72, 74, 76, 78, 80, 82, 84, and 86 in to mating relationship with the aforementioned connectors, 150, 152, 156, 158, 160, 162, 164, 166, 168, and 170.

Figure 7:
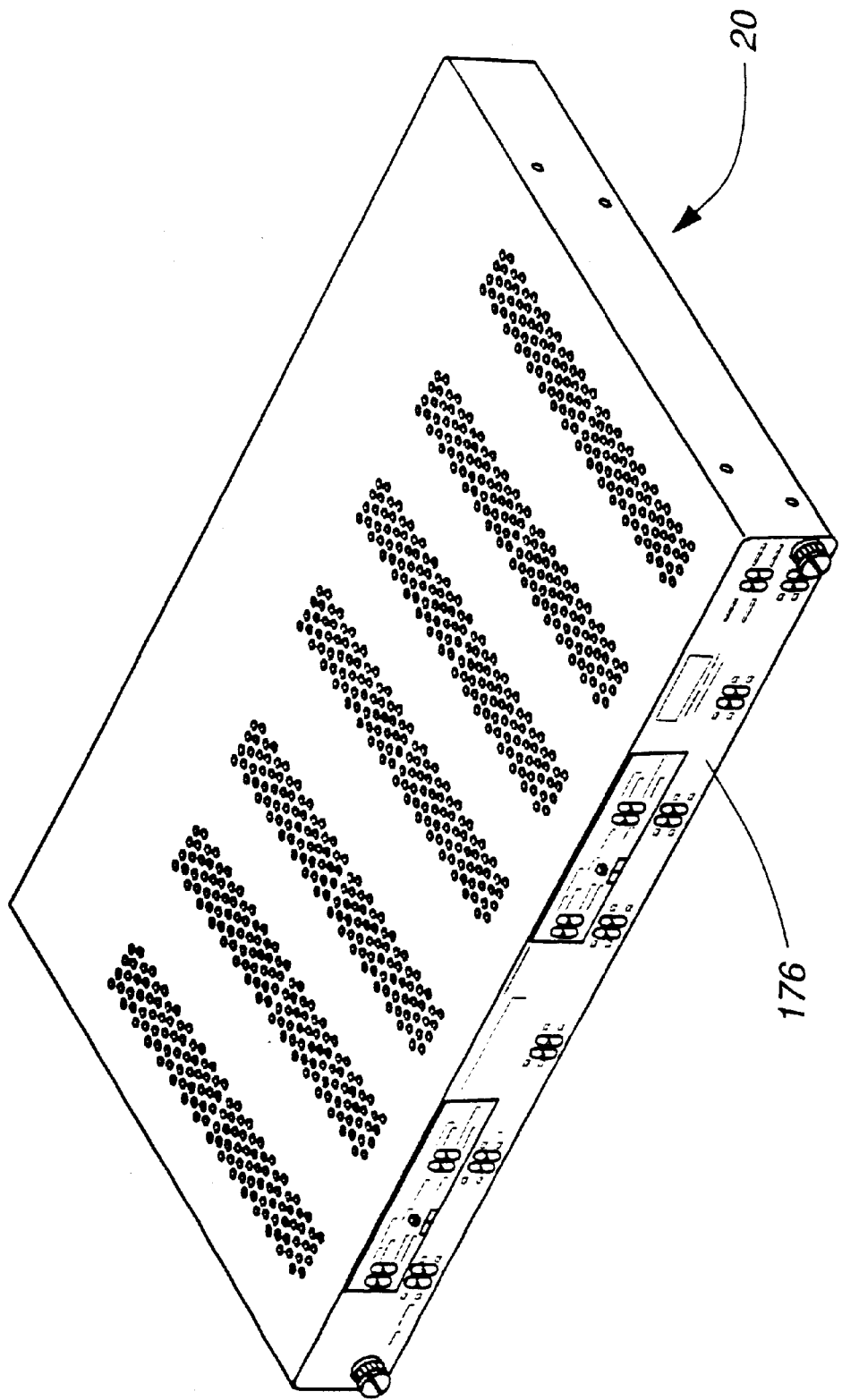
FIG. 7 is a perspective view of the multiplexer device of FIG. 1.
Figure 8:
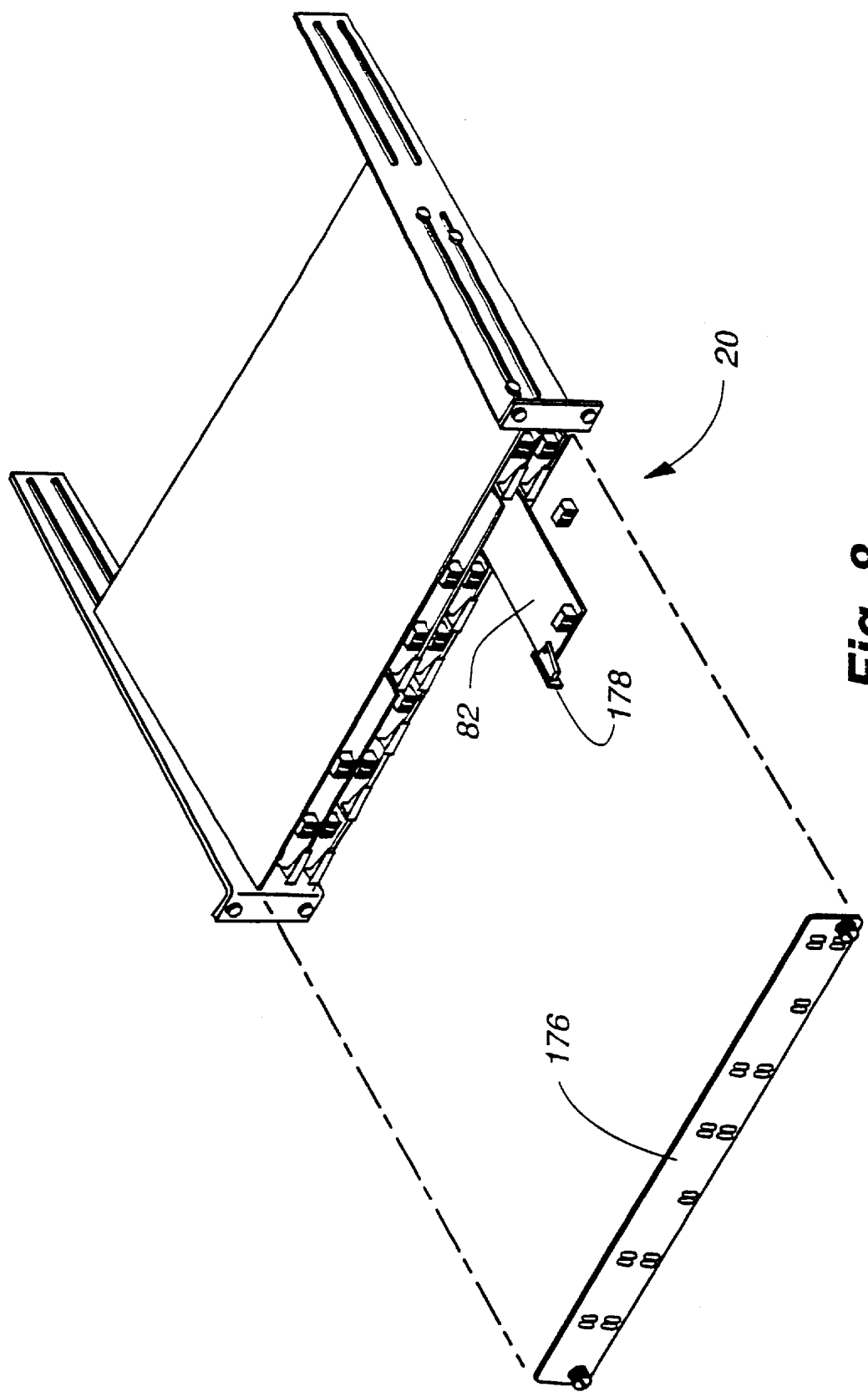
FIG. 8 is a perspective view of the multiplexer device of FIG. 1, showing a removable front plate removed and one of a plurality of DSX-1 cards partially removed from the device.
Figure 9:
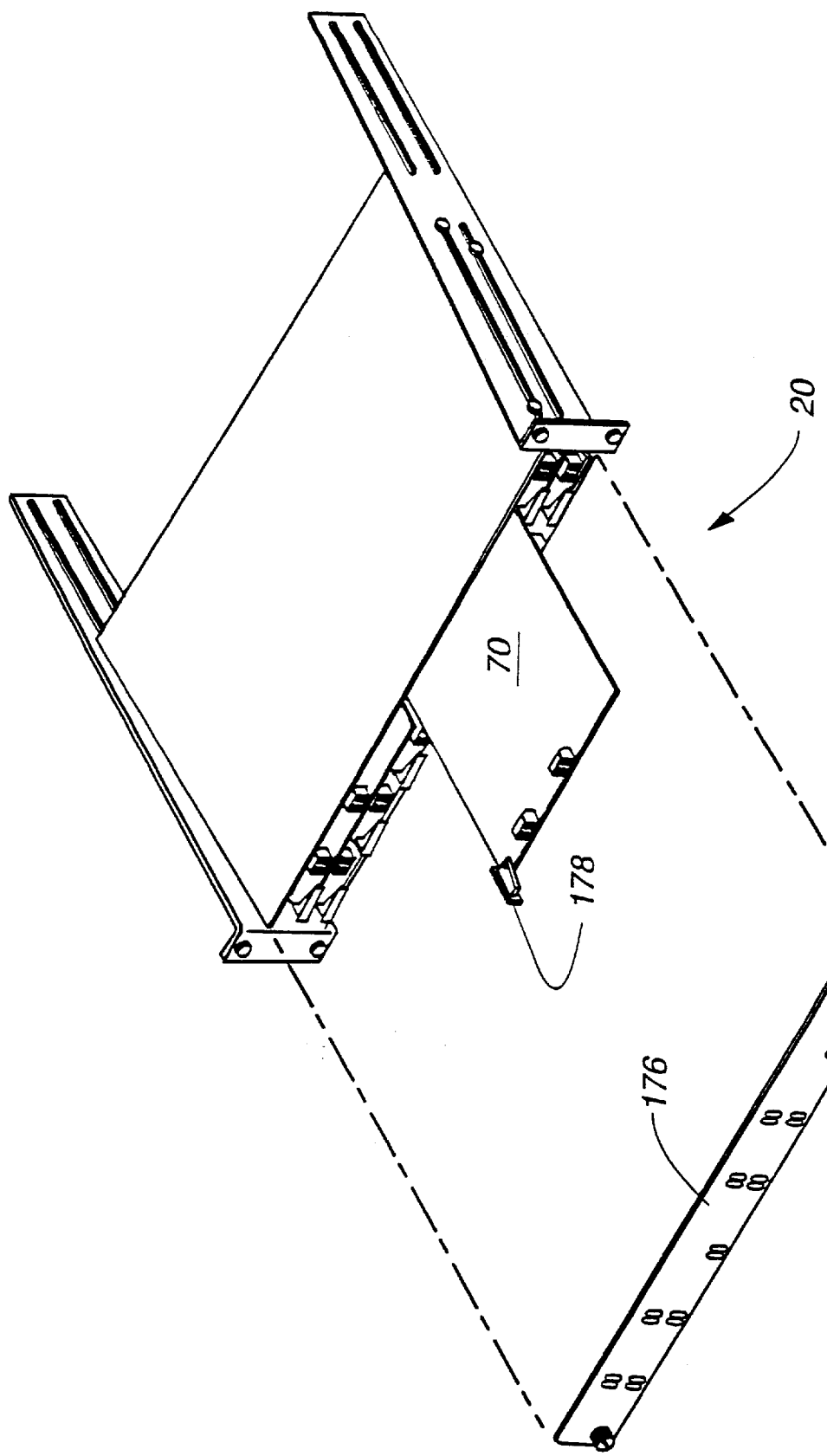
FIG. 9 is a perspective view of the multiplexer device of FIG. 1, showing a removable front plate removed and one of a plurality of controller cards partially removed from the device.

As can be appreciated in FIGS. 7–9, the controller cards and DSX-1 cards can be easily accessed and removed or replaced from and into the multiplexer device 20 through a removable front panel 176. The controller cards 68 and 70 are located side-by-side in the upper portion of the multiplexer device 20 while the seven primary DSX-1 cards 72, 74, 76, 78, 80, 82, and 84 are located side-by-side along the bottom of the multiplexer device 20 below the controller card 68 and 70. The spare DSX-1 card 86 is located at the same level as the controller card 68 and 70 and above the last primary DSX-1 card 84. Each of the DSX-1 cards 72, 74, 76, 78, 80, 82, 84, and 86 and controller cards 68 and 70 each have card ejector latches 178 provided on a corner thereof for convenient removal and latching of the card from and to the housing enclosure 60.

As shown in FIG. 2A, each of the DSX-1 cards 72, 74, 76, 78, 80, 82, 84, and 86 have quad line interface devices 40 thereon, such as a PM4314 QDSX, available from PMC Sierra, Vancouver, British Columbia. Each quad line interface device 40 includes four sets of line interface electronics 250 therein, to act as a transceiver and convert between line-encoded signals and TTL DS-1 bit streams. Each of the DSX-1 cards also has four relays provided thereon. Card 72 has relays 180, 182, 184, and 186 which correspond to T-1 lines T1-1, T1-2, T1-3, and T1-4, respectively. Card 74 has relays 188, 190, 192, and 194 which corresponds to T-1 lines T1-5, T1-6, T1-7, and T1-8, respectively. Card 76 has relays 196, 198, 200, and 202 which correspond to T-1 lines T1-9, T1-10, T1-11, and T1-12, respectively. Card 78 has relays 204, 206, 208, and 210 which corresponds to T-1 lines T1-13, T1-14, T1-15, and T1-16, respectively. Card 80 has relays 212, 214, 216, and 218 which corresponds to T-1 lines T1-17, T1-18, T1-19, and T1-20, respectively. Card 82 has relays 220, 222, 224, and 226 which corresponds to T-1 lines T1-21, T1-22, T1-23, and T1-24, respectively. Card 84 has relays 228, 230, 232, and 234 which corresponds to T-1 lines T1-25, T1-26, T1-27, and T1-28, respectively. The spare card includes four relays 236, 238, 240, and 242 thereon. The first relays 180, 188, 196, 204, 212, 220, 228, and 236 of each card is connected together by a control line 252. Similarly, the second relays 182, 190,198, 206, 214, 222, 230 and 238, the third relays 184,192, 200, 208, 216, 224, 232, and 240, and the fourth relays 186, 194, 202, 210, 218, 224, 234, and 242 are connected together by respective control lines 252. Each of the relays 180–234 on the seven primary cards 72–84 can be selectively and alternatively controlled to connect the tip and ring lines of the DSX-1 signals to either the line interface electronics 250 on the cards 72–84 or to the respective control lines 252. On the spare card 86, the relays 236, 238, 240, and 242 can be used to selectively and alternatively connect the respective control lines 252 either to loopback circuits 254 or to line interface electronics 250 on the spare card 86.

In the normal operating mode, each of the relays 180–234 is selected to connect the T-1 lines to the line interface electronics 250 on the cards 72–84. The line interface electronics 250 convert the signals as described above and they are then connected through the internal backplane 92 to the controller cards 68 and 70. If, however, it is determined that any of the line interface electronics 250 on the cards 72–84 is malfunctioning, then any one of or a combination of the relays 180–234 can be selected to connect the respective T-1 lines to the respective control lines 252 so as to utilize the line interface electronics 250 on the spare card 86. In this case, the signals are similarly conditioned by the line interface electronics 250 of the spare card 86 and routed to the controller cards 68 and 70 through the internal backplane 92. If it is desired to perform testing and/or fault isolation of the components of the low-speed network 22, the appropriate ones of the relays 180–234 can be selected to connect the respective T-1 lines to the respective control lines 252 and route them to the spare card 86 where the selected ones of the relays 236, 238, 240, and 242 can be selected to connect the control lines 252 to the loopback circuits 254 rather than to the line interface electronic 250 of the spare card 86. The loopback circuits 254 are merely metallic connections of the tip and ring members to each other so that the T-1 lines from the low-speed network 252 have the tip signal reflected back to the ring signal for fault isolation of the components of the low-speed network 22.

Figure 25:
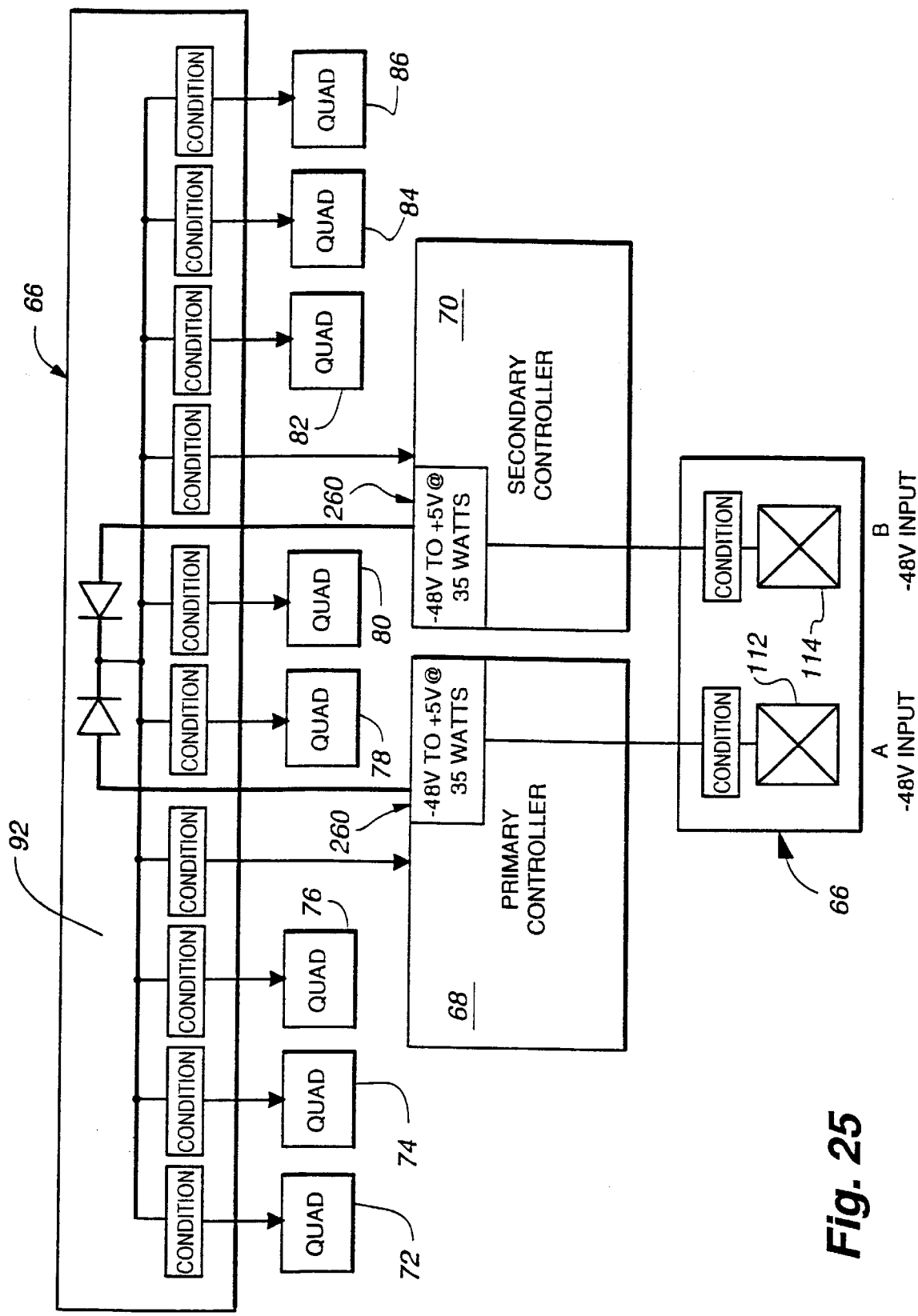
FIG. 25 is a simplified block diagram of portions of the multiplexer device of FIG. 1, showing the power distribution and sharing arrangement.

Each of the controller cards 68 and 70 are identical, so for ease of explanation, only one of the controller cards will be explained in detail, with reference to FIGS. 2A and 2B. The controller card 68 is provided with a power converter 260 thereon which receives external power from one of the power sources 26 and 28 through one of the power input connectors 112 and 114 on the external backplane 90, as is also shown in FIG. 25. The power is passed from the external backplane 90 through the internal backplane 92 to the controller card 68 where it is routed to the power converter 260 thereon. The power converter 260 is operative to convert –48 Volt DC power to +5 Volt DC power. From the power converter 260, 5 Volt power is distributed to all the components of the controller card 68. In addition, power is provided back through diodes and through the connectors 150 and 152 into the internal backplane 92 and to the DSX-1 card 72–86 via connectors 156 170 and to the other controller card if necessary. If either of the controller cards 68 and 70 are missing, the power converter 260 of the other card can provide adequate power for the card itself and for the DSX-1 cards 72–86. The power converter 260 also includes circuitry thereon to provide +5 Volt over voltage detection 262, +5 Volt under voltage detection 264, over temperature detection 266, as well as –8 Volt under voltage detection and AC power failure detection.

The controller 68 includes a selector 270 which includes four Altera 7064 chips 272, 274, 276, and 278 for selecting which four of the thirty-two DSX-1 lines from the DSX-1 cards 72–86 are not mapped through to the multiplexer circuit (deselected), since only twenty-eight DSX-1 signals can be multiplexed. The first selector chip 272 allows for deselection of one of T1-1 from card 72, T1-5 from card 74, T1-9 from card 76, T1-13 from card 78, T1-17 from card 80, T1-21 from card 82, T1-25 from card 84, and spare 1 from the spare card 86. In a similar fashion the other three selector chips 274, 276, and 278 allow for the deselection of one of the respective T-1 and spare lines of each of the cards 72–86. The output of the selector 270 is provided to the M1-3 multiplexer circuit 42 such as a PM8313 D3MX., as is available from PMC Sierra in Vancouver, British Columbia. The M1-3 multiplexer 42 includes seven M1-2 multiplexers 44. The outputs of the seven M1-2 multiplexers 44 are provided to the M2-3 multiplexer 46. Of course, each of the multiplexers 44 and 46 accomplish multiplexing in one direction and demultiplexing in the opposite direction. The M2-3 multiplexer 46 is attached to the framers 48, including a DS-3 transmit framer 284 and a DS-3 receive framer 286. From these framers 284 and 286 of the multiplexer circuit 42, electrical connection is made to the transceiver 50 to act as a receiver and a transmitter to receive data from and transmit data to the high-speed network 24. The transceiver 50 may be an advanced DS-3/STS-1 receiver/transmitter with extended features such as an ARTE:TXC-02021, available from Transwitch in Shelton, Conn.

The transceiver 50 includes transmitter I/O control 290 and receiver I/O control 292. A PRBS generator 294 is attached to the transmit I/O control 290. The transceiver 50 also includes a PRBS analyzer 296 attached to the receive I/O control 292. Loopback control 298 is provided for commanding the transmit I/O control 290 and receive I/O control 292 to create a loopback. Also in the transceiver 50 is a Bipolar 3-zero Substitution (B3ZS) encoder 300 which receives the signal from the transmit I/O control 290 and provides the signal to an output control circuit 302. The received signal from the highspeed network 24 is provided to an adaptive equalizer/automatic gain control (AGC) which provides its output to a clock recovery circuit 306 which in turn supplies a signal to a B3ZS decoder 308 supplies the signal to the received I/O control 292. A DS-3 alarm indication signal (AIS) generator 310 which generates AIS signals as desired for both transmission and reception and supplies the same to the B3ZS encoder 300 in the receiver I/O control 292. An auxiliary loopback 312 is provided between the B3ZS encoder 300 and the clock recovery circuit 306. A loss of signal detector 314 is connected to the adaptive equalizer/AGC 304 to detect when no signal is being received.

The selector 270, the multiplexer circuit 42, and the transceiver 50 are all controlled by a microprocessor 52 on the controller card 68. The microprocessor may be a Motorola MC68EN302 processor. Associated with the microprocessor 52 is an address bus 320 and a data bus 322 which allow the microprocessor 52 to communicate with the selector 270, the multiplexer circuits 42, a bus gate 324, an EEPROM 326, a program ROM 328, and a static RAM 330. The microprocessor 52 also communicates through its data lines with a 373 latch 332 which is attached to the alarm and mode indicator lights 334 on the controller card 68 and to a relay configuration circuit 336.

Figure 10:
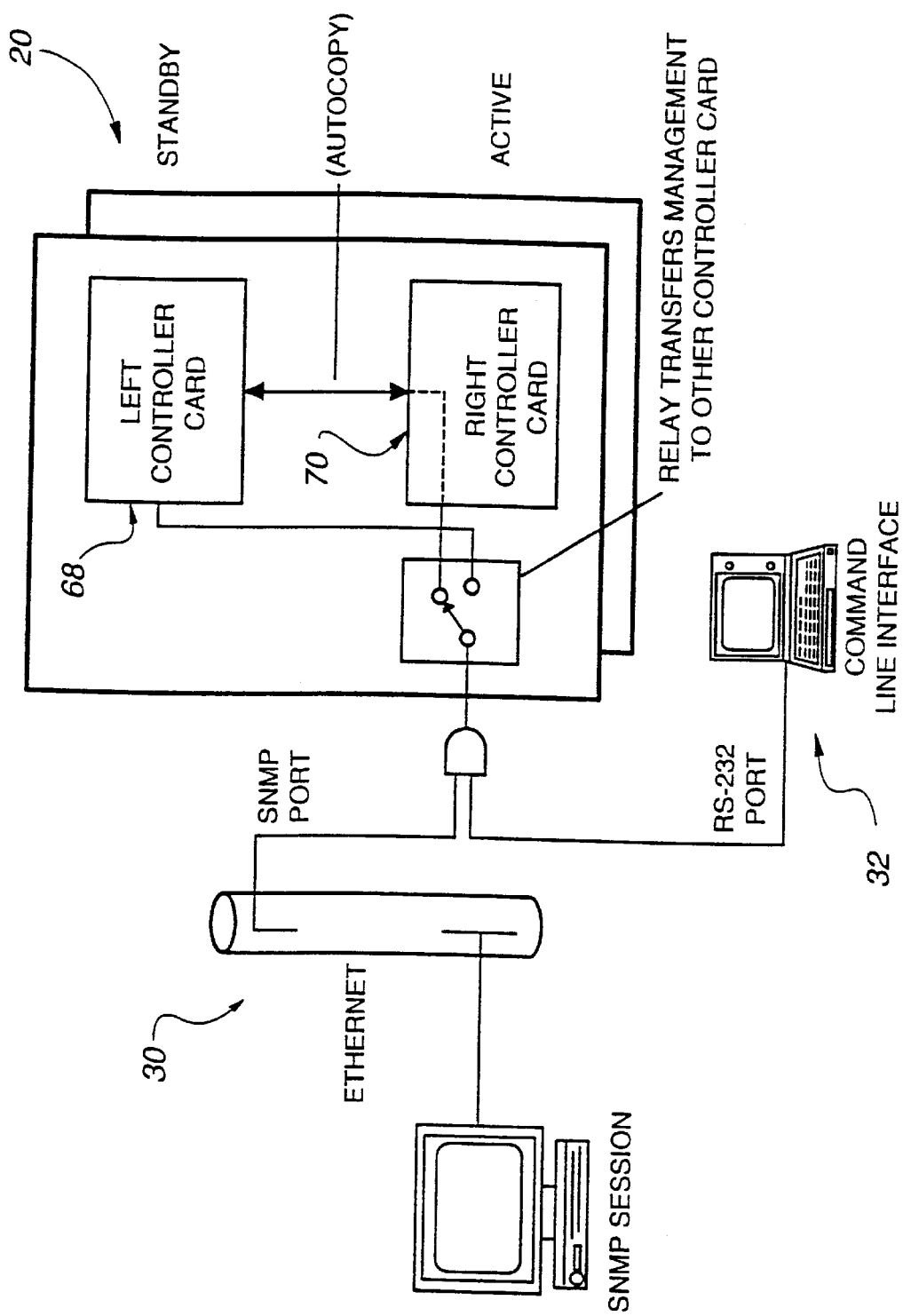
FIG. 10 is a block diagram of the connection of the multiplexer device of FIG. 1 to a computer network and to an external computer terminal.

The microprocessor 52 also includes an Ethernet connection 338 for connection to a computer network, as shown in FIG. 10. An serial input port 340 for connection to an RS-485 serial I/O driver 342 which is provided to the RJ-45 external connector 104 and a serial input port 344 connected to an RS-232 serial I/O driver 346 which is connected to the RS-232 external connector 126. The controller card 68 also includes logic 350 distributed thereon for arbitrating between the two controller cards 68 and 70 to determine which shall be the card used and which shall be the backup card at any given time. The logic is described functionally in further detail below in the redundancy section.

The receiver and transmitter ports of the transceiver 50 on each of the controller cards 68 and 70 attach to a group of relays for selective attachment to either one of the T-3 lines and to dummy loads. A first relay 351 is used to selectively and alternatively connect the receive port of the primary controller card 68 to either the receive terminal of the primary T-3 link or the receive terminal of the secondary T-3 link. A second relay 352 performs the same function for the receive port of the secondary controller card 70. A third relay 354 can selectively and alternatively place a 75-ohm resistor to ground in parallel with the receive ports of each of the primary and secondary controller cards 68 and 70. A fourth relay 356 can selectively and alternatively connect the transmit port of the primary controller card 68 to a fifth relay 357 or to a 75-ohm resistor to ground. A sixth relay 358 performs the same function for the transmit port of the secondary controller card 70. The fifth relay 357 is operative to selectively and alternatively connect the output of the fourth relay 356 to the transmit terminal of the primary T-3 link and the output of the sixth relay 358 to the transmit terminal of the secondary T-3 link or connect the output of the fourth relay 356 to the transmit terminal of the secondary T-3 link and the output of the sixth relay 358 to the transmit terminal of the primary T-3 link. All of the relays 351, 352, 354, 356, 357, and 358 are controlled by the arbitration logic 350 distributed on the controller cards 350.

Redundancy Discussion

The multiplexer device 20 can be seen to have redundancy for the controller card 68 (via standby controller card 70) in a mode known as electronics protection mode. Additionally, the multiplexer device 20 can operate in an electronics and network protection mode in which there is both a backup controller card 70 and a backup T-3 link to the high-speed network 24. Additionally, it may be possible to provide a network protection mode in which there is a spare T-3 line for connection to the high-speed network 24 but not a backup controller card. Each of these modes will be discussed in further detail below.

Figure 11:
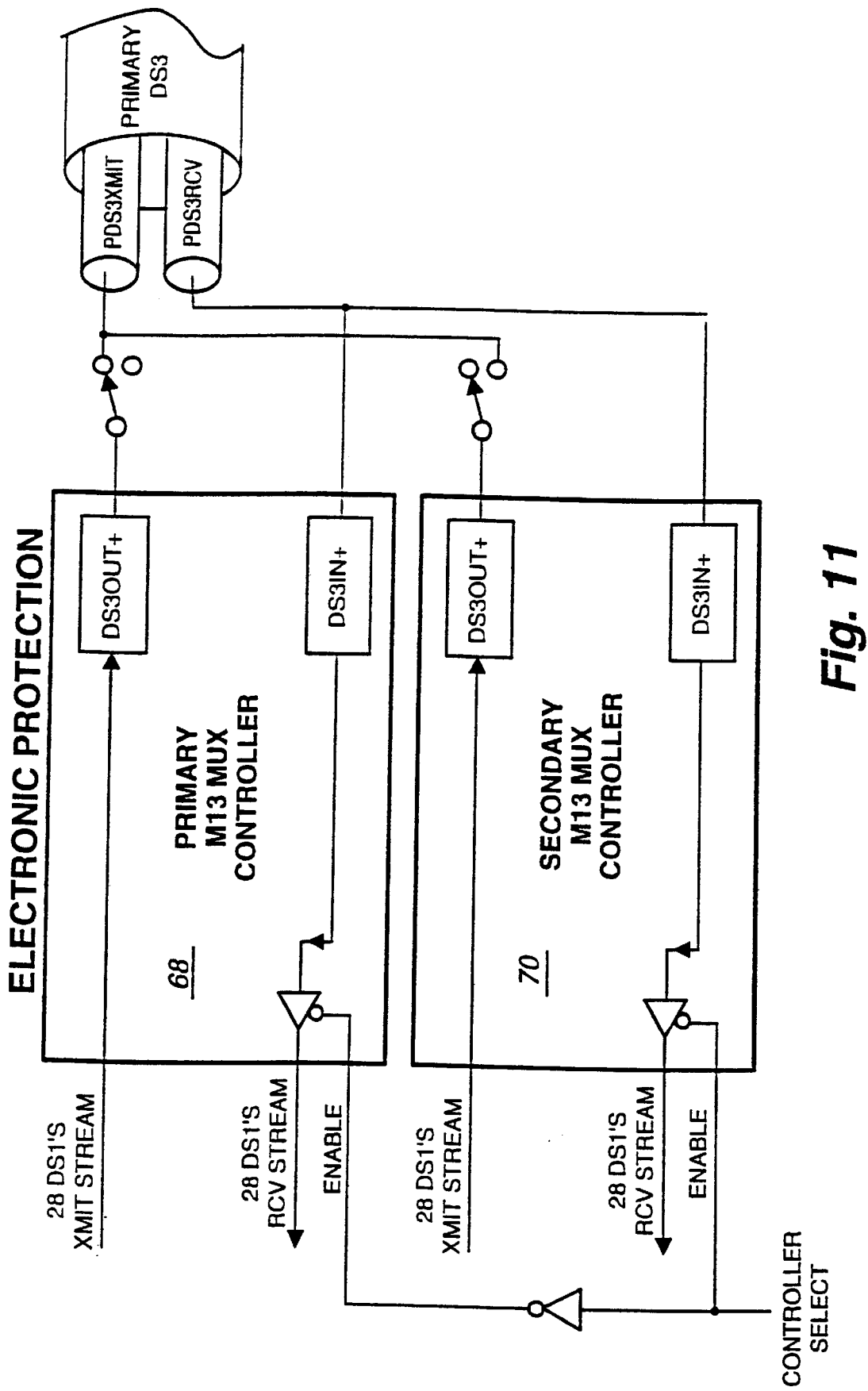
FIG. 11 is a simplified block diagram of portions of the multiplexer device of FIG. 1 showing an electronics protection mode.

As seen with reference to FIG. 11, the electronics protection mode features two controller cards 68 and 70 which are alternatively and selectively connected to the primary T-3 channel through relays which are a functional combination of relays 356, 357, and 358 described above. When it is desired for the first controller card 68 to be the active controller, a receive enable signal is provided to the controller card 68 and a disable signal is provided to the controller card 70 to tri-state the output from the receiver to the 28 DSX-1 signals. In addition, the relay is actuated to connect the transmit section of the controller card 68 to the transmit coaxial cable of the T-3 line. Similarly, the other relay is actuated to disconnect the transmit section of the controller card 70 from the transmit coaxial cable of the T-3 line. In this manner, the controller card 68 is operating as the controller in the multiplexer device 20 and the back-up or secondary controller card 70 is not acting as the operating controller card but is fully framed up with transmit and receive data and is ready to begin functioning as the primary controller card when the receiver enable signal is provided and the relays are actuated to connect the controller card 70 to the transmit coaxial cable of the T-3 line. As can be appreciated this approach provides controller card redundancy and allows the controller cards 68 and 70 to be switched based upon the logical state of an enable signal. In the receive direction, the transition time is only dependent on the enablement of an electronics device, and is done in the range of a few nanoseconds and no alarms are set. In the transmit direction, the relays are actuated to connect the transmit section of the standby controller to the transmit coaxial cable of the T-3 line.

Figure 12:
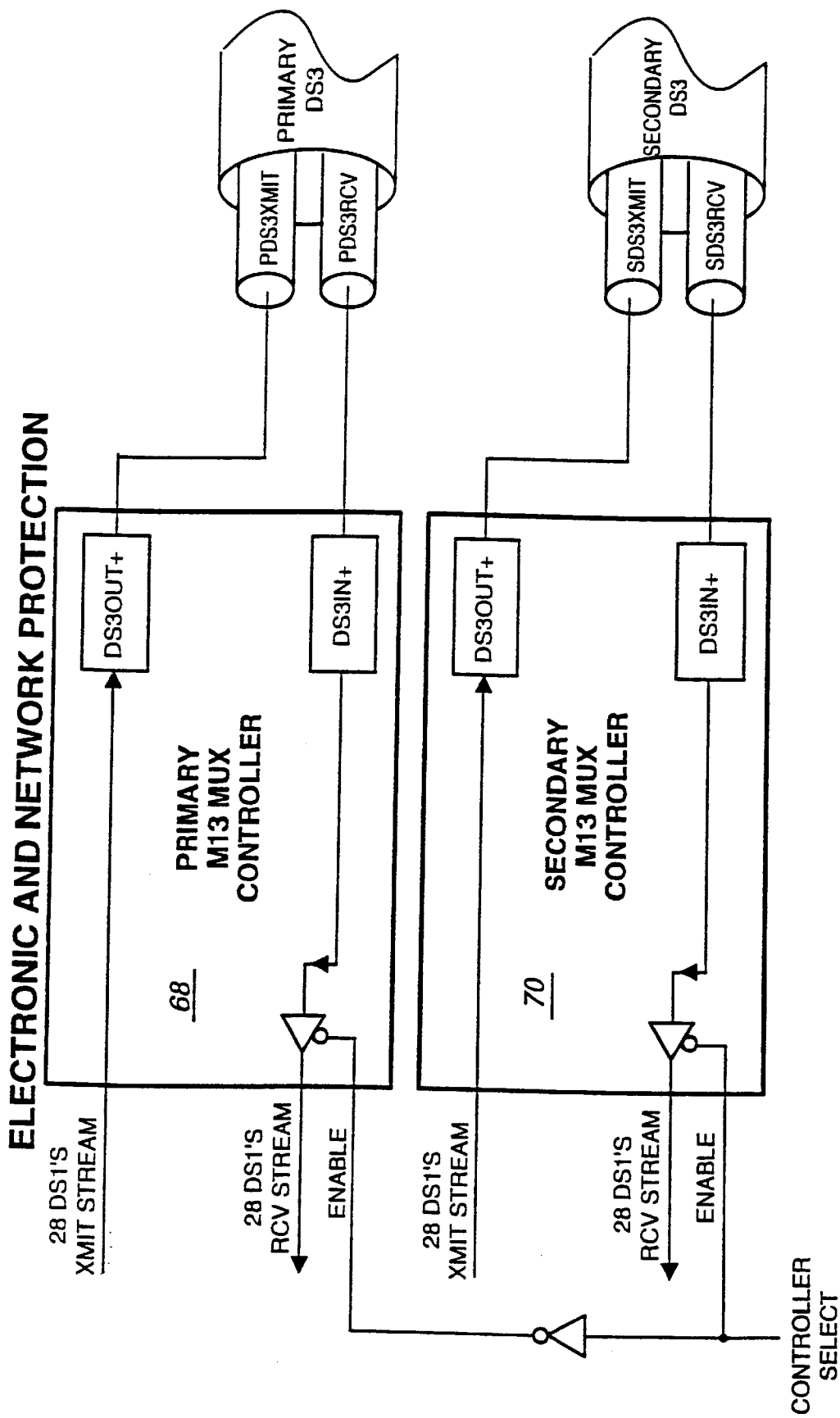
FIG. 12 is a simplified block diagram of portions of the multiplexer device of FIG. 1 showing an electronics and network protection mode.

As can be seen with reference to FIG. 12, the electronics and network protection mode includes both controller cards 68 and 70 and two T-3 connections. In this mode, the primary controller card 68 is connected to the primary T-3 line and the secondary controller card 70 is connected to the secondary T-3 line. The signals from the DSX-1 cards are multiplexed, framed, and simultaneously transmitted on both the primary and secondary T-3 lines, thus transmitting the identical data to the high-speed network 24. Additionally, the receiver on each controller card 68 and 70 is framed up to its respective T-3 line and the controller select signal determines whether the primary controller card 68 or secondary controller card 70 has access to the DSX-1 cards and thus carries the service. In this mode, the system is protected against a controller card failure and a T-3 line failure. During a switchover, the multiplexer device 20 selects the demultiplexed DSX-1 data streams from the secondary controller card 70 by inverting the controller select (enable) signal. The time for transition in the receive direction is on the order of several nanoseconds, whereas the transmission of data on the coaxial cable is continuous.

Figure 13:
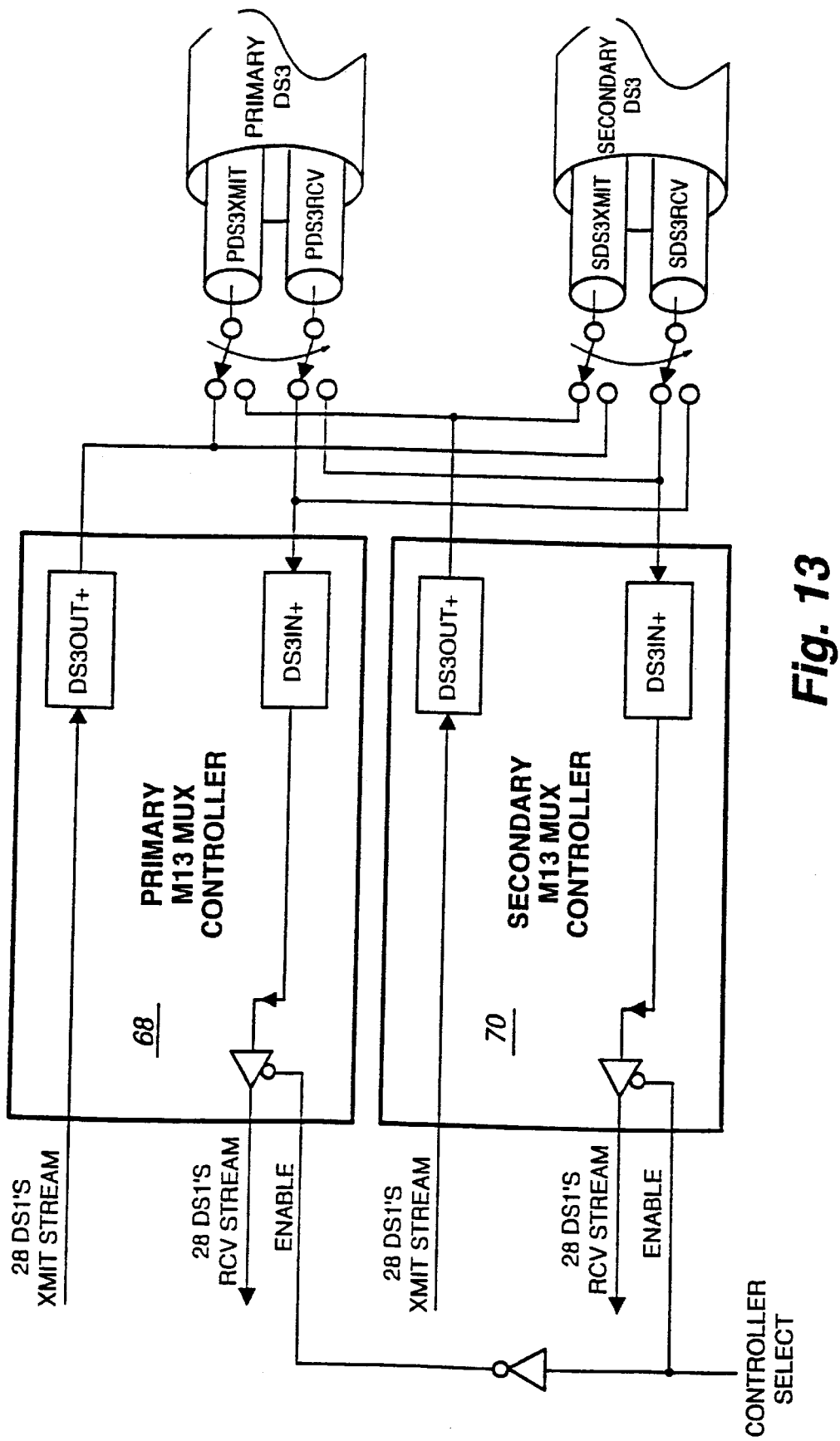
FIG. 13 is simplified block diagram of portions of the multiplexer device of FIG. 1 showing another electronics and network protection mode.

As can be seen by reference to FIG. 13, an electronics and network protection mode can be provided which is similar to the previously described electronics and network protection mode but with the ability to selectively route the signals to and from either of the controller cards 68 and 70 to either one of the T-3 lines. Thus, in this mode, if one of the controller cards has failed or is missing, and the T-3 line on which the remaining or primary controller card is transmitting and receiving also fails, the relays (which are simplified to a functional combination of relays 351, 352, 354, 356, 357, and 358) can switch to route the DS-3 signals through the secondary T-3 line. As can be appreciated, if only one of the controller cards 68 and 70 is installed, then essentially this mode is a network protection mode where either one of the T-3 links can be connected to the remaining controller card so that there is redundancy for the T-3 link but not for the controller card.

Of course, it is also possible to continue to operate the system with only one controller card 68 or 70 operating and only one of the T-3 lines operating. Clearly, there is no redundancy available for the controller cards or T-3 lines when in this mode and if a malfunction occurs it is likely that all of the users whose telephone calls are being routed through the multiplexer device 20 will lose service.

There are several categories of events which can cause the processors 52 and the system control arbitration logic 350 therein to switch (or inhibit switching) between the different controller cards 68 and 70 and the different T-3 lines. These event categories include: (1) catastrophic equipment failures; (2) forced manual switching; (3) lockout: (4) DS-3 line or path failures or defects; (5) a wait-to-restore period; and (6) a bit error rate (BER) that exceeds the user selected threshold. Each of these will be discussed in further detail below.

Catastrophic equipment failures are grouped together because they all have the potential of disrupting the peripherals hanging off of the external bus as a result of bogus write cycles performed by the failed controller before the arbitration logic 350 forces it to give up control of the system. Whenever a switch to the standby controller card occurs as a result of the catastrophic equipment failure, the DSX-1 cards 72–84 are reinitialized, and the DS-3 path configuration and alarm relays are set. The following events constitute a catastrophic failure switch event: (1) the active controller card is physically pulled from the system (this catastrophic equipment failure can be prevented by first manually switching control to the standby controller card); (2) a reset signal is asserted on the active controller card by a "watch dog" circuit which may set the reset for voltage sags or the time out of a "watch dog" timer which indicates the ill health of the microprocessor 52 or the code therein; and/or (3) the microprocessor 52 on the active controller card detects a bus error on its own card or in the connection to one of the DSX-1 cards 72–86. Catastrophic failures supersede all other failures, and will invoke a switch event regardless of all other settings.

A manual switch can be initiated by using the switch command via the command line interface through either the Ethernet connection 338 or the RS-232 input. This can be commanded as follows: "Widebank (A: Active)>switch." If the other controller card is deemed fully functional, the switch event will be initiated immediately. If, however, the user attempts to switch to the other controller card when that controller card is deemed nonfunctional by the microprocessor 52, the user will be prompted as to whether they wish to continue. If they do not choose to do so, the switch will be aborted. If they do choose to continue (a forced switch), the switch will be initiated provided the other controller card is not experiencing a catastrophic failure.

The event category of a lockout occurs when a command is entered by a user to inhibit switching as is described further below.

DS-3 line or path defects are also switch event categories. This switch event category is only valid when the multiplexer device 20 is used in the network protection mode. If a near end line or path defect such as loss of signal (LOS) as detected by the LOS detector 314 detects 175±75 consecutive zeros, an out-of-frame (OOF) condition occurs (which is defined as the occurrence of at least three F-bit errors out of sixteen consecutive frame bits or at least one M-bit error in three out of four consecutive M frames), an alarm indication signal (AIS) wherein the AIS pattern itself is received with a BER of better than $10^-$ received for 2.23 milliseconds. If any of the above is detected, a switch event will be initiated provided each of the following conditions are met: (1) DS-3 network protection is selected; (2) the link between the microprocessors 52 indicates that the other controller card is in standby mode; (3) the defect count for the standby controller card is equal to zero; (4) automatic protection switching is armed; and (5) the other controller card is not experiencing a catastrophic failure.

While the above event condition is not integrated over time, the following event condition is integrated over time. Specifically, the event condition occurs if any of the line or path defects described above persists for a length of 2.5 ±0.5 seconds and the following four conditions are satisfied: (1) the link between the microprocessors 52 indicates that the other controller card is in the standby mode; (2) the defect count for the standby controller card is equal to zero; (3) automatic protection switching is armed; and (4) the other controller card is not experiencing a catastrophic failure. Please note that it is not required for this type of failure that DS-3 network protection be selected.

A wait-to-restore period is provided which prevents constant switching to force a hysteresis, as is described in further detail below.

Another switch event category is a BER that exceeds a selected threshold. A count of the line coding violations detected by the receiver of transceiver 50 of the selected controller card is used to calculate a bit error rate (BER) for the DS-3 signal. The BER switching threshold is selected using the DS-3 threshold command through either of the external computer inputs. The command is "Widebank (A: Active)>ds3 threshold N." In correspondence to the bit error rate threshold as in, for example, if N=6 the bit error rate must be greater than $10^{-6}$, which may take up to 10 seconds to detect. When N=5 the bit error rate must be greater than $10^5$ which may take up to 1 second to detect. It may be as small as 4, in which case the bit error rate must be greater than $10^4$ which may take as much as 100 milliseconds to detect. If N is set to OFF, this disables BER switching. The threshold selected by the user dictates the maximum detection time as described above. Once the BER threshold has been exceeded, the switch event will be initiated provided that: (1) the link between the microprocessors 52 indicates that the other controller is in the standby mode; (2) the BER for the standby controller is operating at a BER ten times better than that for the active controller; (3) the defect count for the standby controller card is equal to zero; (4) automatic protection switching is armed; (5) the controller card is not in a wait-to-recover period; and (6) the other controller card is not experiencing a catastrophic failure.

The time required for the completion of a switch between controller card 68 and 70 or between T-3 lines is dependent upon the operational mode. Such switching is known as protection switching. When operating in electronics protection mode, once the criteria for a switch event has been met, the switch will be initiated within 50 milliseconds in the worst case, and 25 milliseconds in the average case. Once a switch is initiated, the physical relay switch operation will be completed within 4.5 milliseconds in the worst case (4 milliseconds to set the relay and 0.5 milliseconds of switch bounce), with 3 milliseconds as the average case. When operating in network protection mode, once a hard DS-3 line or path defect (such as an LOS, OOF, or AIS) or catastrophic equipment failure is detected, a protection switch will be initiated within 100 nanoseconds in the worse case, and completed within 9 nanoseconds in the worst case. This relatively short time period to transition is due to the fact that the controller card merely must be enabled by changing the state of an enable command. After the detection of a soft failure (such as exceeding a BER threshold) or manual switch request, the switch will be initiated within 50 milliseconds in the worse case, and 25 milliseconds in the average case. Once a switch is initiated, the switch operation will be completed within 9 nanoseconds in the worse case.

The multiplexer device 20 is provided with the functionality to operate in a reverting mode or in a non-reverting mode. The nonreverting mode complies with regulatory specifications which states that automatic protection switching should not be operating in a reverting mode. A reverting mode allows a piece of telecommunications equipment such as the multiplexer device 22 to place back into service a card such as the initial primary controller card which had previously been determined to be malfunctioning. For example, if the controller card 68 is initially the primary card and the controller card 70 is the secondary card and, due to one of the conditions discussed above, an automatic switch takes place to place the secondary controller card 70 as the in-service controller card, if an error then occurs in the secondary controller card 70 control can switch back to the initial primary controller card 68 if that controller card 68 is functioning properly at the time. A non-reverting mode would not allow this last switch to occur. Part of the logic behind not allowing a reverting mode is that it may be undesirable for a piece of equipment such as the multiplexer device 20 to oscillate between different internal components. Such oscillation can have an impact throughout the telecommunications system. For this reason, it has typically been prohibited. Because some error scenarios vary with time and because users want greater flexibility in their systems, however, a reverting mode is available on the multiplexer device 20 so that a user can select reverting mode if they so desire. The default setting will be the non-reverting mode, so that the user will have to take an overt action to leave the non-reverting mode and place the device 20 into the reverting mode.

The automatic protection switching for the device 20 can be user selected to operate in the revertive and non-revertive mode by using the revertive command: "Widebank (A: Active)>revertive off" places the device 20 in the non-revertive mode while "Widebank (A: Active)>revertive on" places the device 20 in the revertive mode.

In the non-revertive switching mode, if an automatic protection switch event occurs while protection switching is armed, the traffic is switched to the other controller on a one-shot basis. The load will continue to be carried by the protection line until a manual switch is effected, or a switch event occurs after the automatic protection switching has been rearmed using the armed command. "Widebank (A: Active)>arm off" disables automatic protection switching when in non-revertive mode while "Widebank (A: Active) >arm on" enables one-shot automatic protection switching when in non-revertive mode. While operating in the non-revertive mode, automatic protection switching will not occur if the device 20 is not armed as discussed above.

For electronics protection mode, revertive switching simply rearms the automatic protection switching after a wait-to-restore period of five minutes after the fault that caused the switch is corrected. In essence, this wait-to-restore period of five minutes forces a hysteresis in the system so that oscillations having a time period of less than ten minutes are not possible. For network protection mode, however, the traffic will be returned to the primary working line or equipment after a wait-to-restore period of five minutes provided the following conditions are all met: (1) revertive switching as selected; (2) the link between the microprocessors 52 indicates that the other controller is in standby mode; (3) the working line has a BER ten times better than the selective switching threshold; (4) the defect count for the standby controller card is equal to zero; (5) the controller card is not in a wait to restore period; and (6) the other controller is not experiencing a catastrophic failure.

The wait-to-restore period will be overruled if at any time during this period the traffic will be switched back to the primary card provided that the following four conditions are all met: (1)revertive switching is selected; (2) the link between the microprocessors 52 indicates that the other controller is in the standby mode; (3) the defect count for the standby controller card is equal to zero; and (4) the other controller cord is not experiencing a catastrophic failure.

Automatic protection switching can be locked out by selecting the non-revertive mode of operation and dearming the system with the commands discussed above. Under these conditions, switching will only occur if there is a catastrophic equipment failure, or switching is manually initiated.

When in electronics protection mode, switching the DS-3 traffic incurs up to a 4.5 millisecond (in the worst case) loss of data. This will induce a considerable number of errors on the transmitted DS-3 signal. When in network protection mode, a fast switching procedure is used at the DSX-1 logic signal level. This switch may introduce extra bits into the demultiplexed bit stream inducing an OOF defect in the terminating equipment.

The automatic protection switching discussed above utilizes the link between the microprocessors 52 in order to conduct the comparison of performance and status information. If at any point, the link is not deemed fully functional, automatic protection switching is inhibited until the link is reestablished.

Loopbacks/Alarms/Self-Tests

The multiplexer device 20 provides the ability to verify transmission data paths therethrough. The line interface electronics 250 on the DSX-1 cards 72–86 include a PRBS generator 360, a PRBS detector 362, and a bit error counter (not shown). These test components can be placed in either the receive or transmit DSX-1 data stream so that several BER test modes are available. Individual T-1 BER testing may be conducted toward the T-1 equipment (the "drop"), toward the T-3 line, or internally to the multiplexer device 20. Before activating the PRBS generator 360, the operator enables a loopback at the far end of the line, connecting transmit to receive. Following activation of the PRBS pattern generation, the received pattern synchronization is displayed along with BER counts for the DSX-1 interface under test, using the command line interface, via RS-232 or Telnet.

As shown in FIG. 14, a DSX-1 line loopback mode loops the received DSX-1 signal back to the DSX-1 transmit. This is accomplished within the DSX-1 transceiver by the command "ds1 n line m" where n is the DSX-1 interface under test. This loopback is used by the operator to detect malfunctions in the low speed network, as opposed to malfunctions in the multiplexer.

As seen in FIG. 15, a DSX-1 equipment loopback mode loops the transmitted DSX-1 signal back to the DSX-1 receive. In this mode, the multiplexer device 20 or a device connected to a device in the high-speed network 24 can test the functionality of the DSX-1 cards 72–86.

Figure 16:
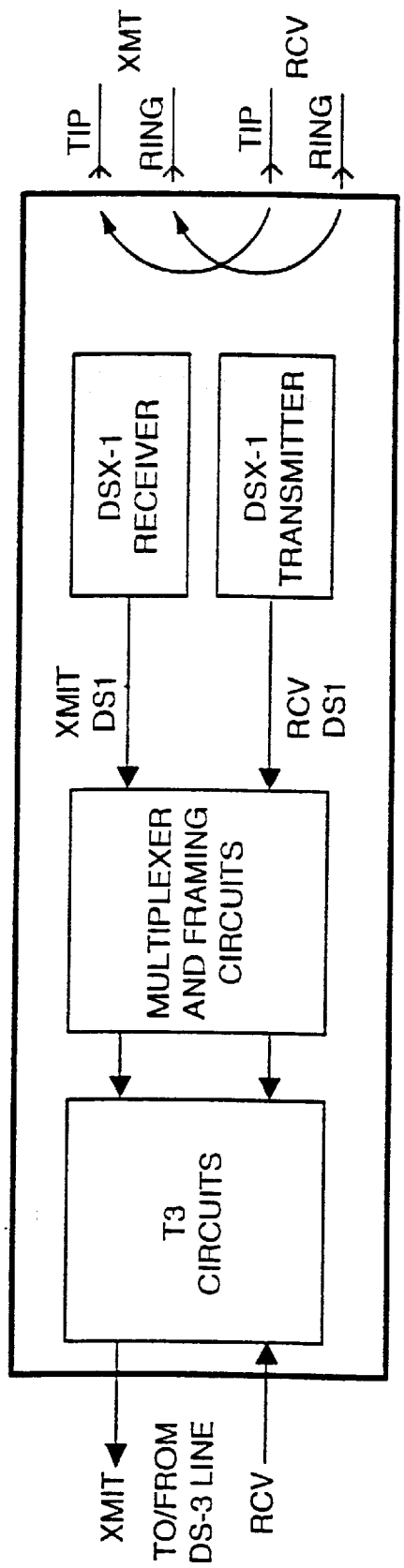
FIG. 16 is a simplified block diagram of portions of the multiplexer device of FIG. 1, showing a DSX-*1* metallic loopback mode.

As seen in FIG. 16, a DSX-1 metallic loopback mode loops the received DSX-1 signal back to the DSX-1 transmit using relays on the respective DSX-1 cards 72–84 to route the signal to the spare card 86 where the metallic loopback circuits 254 are selected. This loopback mode provides "point-of-entry" fault-isolation between the multiplexer device 20 and the low-speed network 22 to detect malfunctions in the low-speed network 22 and connections thereto. The DSX-1 metallic loopback mode may not be available if the spare channels are in use to replace selected ones of the interface electronics 250 on the DSX-1 cards 72–84. Note that the relays on the DSX-1 cards 72–84 are used for two purposes: (1) moving traffic to the spare card 86; and (2) affecting a metallic loopback. In the second case, the relays on the spare card 86 are also closed. This method of using one set of relays to perform two functions uses fewer parts and enables the multiplexer device 20 to be more compact.

The multiplexer device 20 can also monitor and detect Network Interface Unit (NIU) loopback codes originating from the high-speed network 24. A standard five-second integration time to declare loop-up or loop-down codes is used. Upon detecting an NIU loop-up code on a T-1 channel of the DS-3 signal, a DSX-1 equipment loopback mode will be entered by the multiplexer device 20 for that particular channel. This provides for standard loop testing from the high-speed network 24, as if a physical T-1 NIU ("Smart Jack") was connected to each of the 28 T-1 lines. In addition to loopbacks, the line interface electronics 250 on the DSX-1 card 72–86 continuously monitor the incoming physical T-1 line quality for excess zeros, loss of signal, and bipolar violations.

As seen in FIG. 17, a DS-3 line loopback mode returns the received DS-3 signal from the transceiver back to the transceiver output, without being processed by the M1-3 framer. This loopback is accomplished via the loopback control 298 in the transceiver 50.

As shown in FIG. 18, a DS-3 payload loopback mode returns the received DS-3 signal from the transceiver through the framer and back to the transceiver output, overriding the DS-3 signal created internally by multiplexing the lower speed T-1 signals. The received DS-3 signal is still processed by the M1-3 framer. This is accomplished by enabling payload loopback for each DS-2 stream within the M1-3 multiplexer 42.

Figure 19:
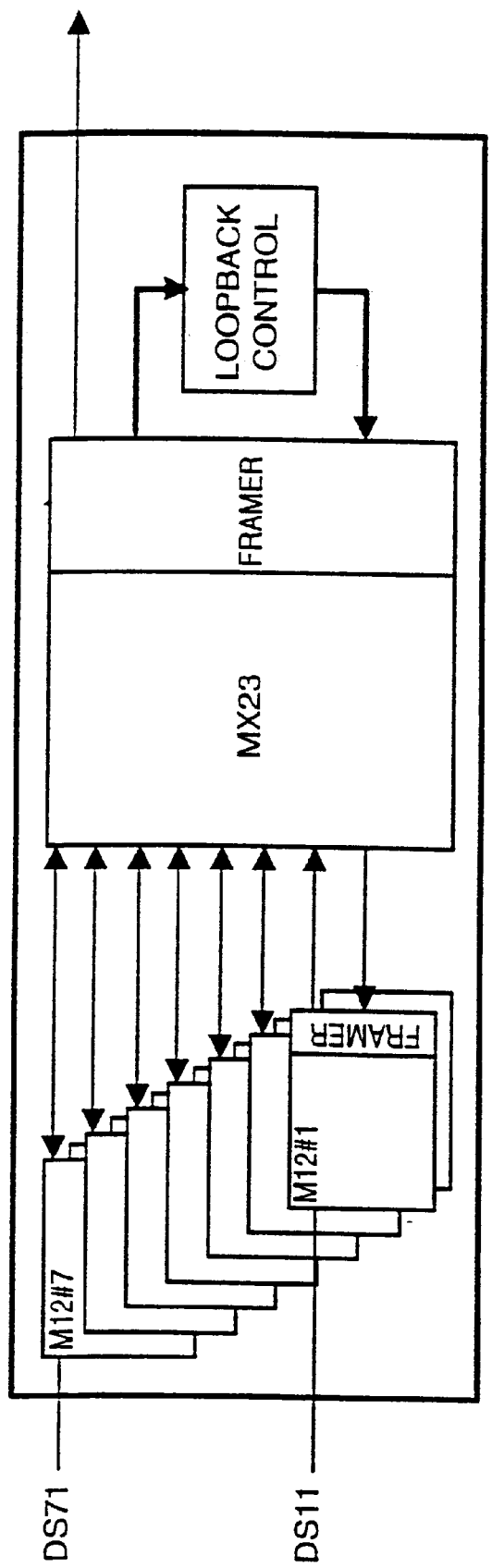
FIG. 19 is a simplified block diagram of portions of the multiplexer device of FIG. 1, showing a DS-3 equipment loopback mode.

As can be seen in FIG. 19, a DS-3 equipment loopback mode returns the transmit signal from the M1-3 framer back to the received signal being sent to the M1-3 framer, replacing the signal received from the line. This equipment loopback is performed by the DS-3 transceiver and validates a full internal DS-3 path through the multiplexer device 20. This loopback is used to send PRBS test patterns back to the DSX-1 transceivers during the self-test mode of the multiplexer device 20.

The multiplexer device 20 follows regulatory standards for M1-3 multiplexer devices by responding to C-bit out-of-band messages on the T-3 line, including loop-up and loop-down. Microprocessor and memory data paths are tested within the multiplexer device 20 by self-tests. A complete self-test is run when power is turned on. Individual self-tests can be run as desired.

The multiplexer device 20 is capable of monitoring DS-3 alarms and performance parameters. The DS-3 alarm signals it can monitor include alarm indication signals (AIS), loss of signal (LOS), out of frame (OOF), and idle sequences. The errors it can monitor include line code violations, excessive zeros, P-bit parity errors, C-bit parity errors, far end block errors, and framing bit errors.

Figure 24:
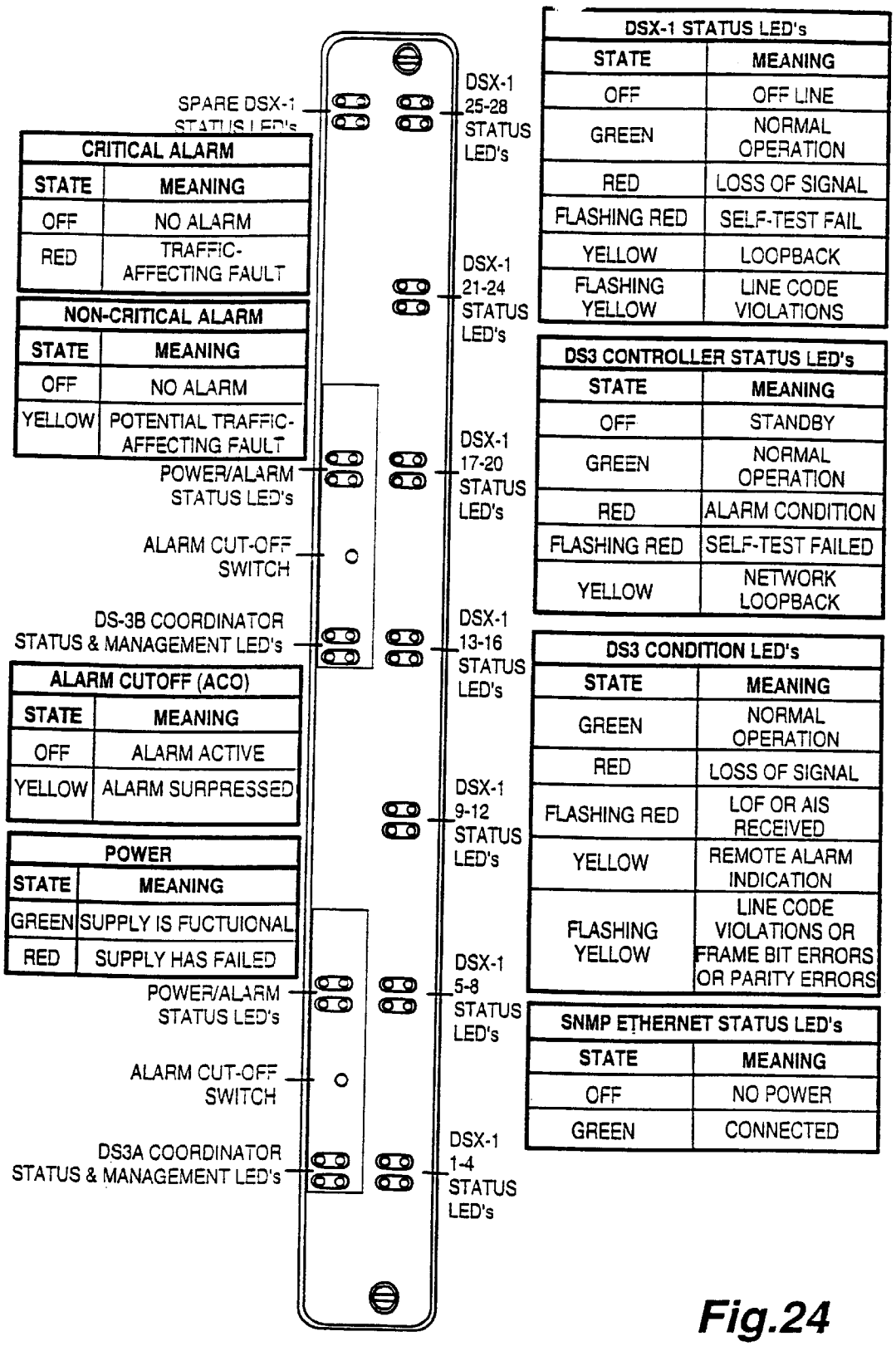
FIG. 24 is a front elevational view of the removable front panel of FIG. 8, showing a plurality of alarm indicators appearing therethrough.

Test and status indicators are visible through the removable front panel 176 of the multiplexer device 20, as shown in FIG. 24. An LED 370 labeled "POWER" is provided for each of the controller cards 68 and 70. Each LED 370 indicates the status of the power supply on its respective controller card. A green state means the power supply is functional, a yellow state indicates the lack of or an insufficient voltage from the −48 Volt supply, and a red state indicates that the power supply has failed. Each of the controller cards 68 and 70 also have a pair of LEDs 370 and 372 labeled critical alarm LED 372 and non-critical alarm LED 374. The alarm LEDs 372 and 374 are off if none of the applicable alarms have been set. The critical alarm LED 372 is in the red state when a critical alarm is set, meaning that a traffic-affecting fault exists. The non-critical alarm LED 374 indicates yellow when a non-critical alarm exists which indicates that a potentially traffic-affecting fault exists or that the standby equipment has detected a fault. Each of the controller cards 68 and 70 also has a controller status LED 376 which in the green state means normal operation, in the red state means an alarm condition, in the flashing red state means a self-test has failed, and in the yellow state means a network loopback mode exists. Each of the controller cards 68 and 70 also has a DS-3 line condition LED 378 which in the green state means normal operation, in the red state means loss of signal (LOS), in the flashing red state means LOF and/or AIS has been received, in the yellow state means RAI, and in the flashing yellow state means line code violations received or frame bit or parity errors.

Each of the quad DSX-1 card 72–86 include status LEDs 380 for each of the DSX-1 signals thereon. The off state means the DSX-1 line is off-line, the green state means normal operation, the red state means loss of signal (LOS), the flashing red state means self-test fail, the yellow state means loopback, the flashing yellow state means line code violations.

Figure 20:
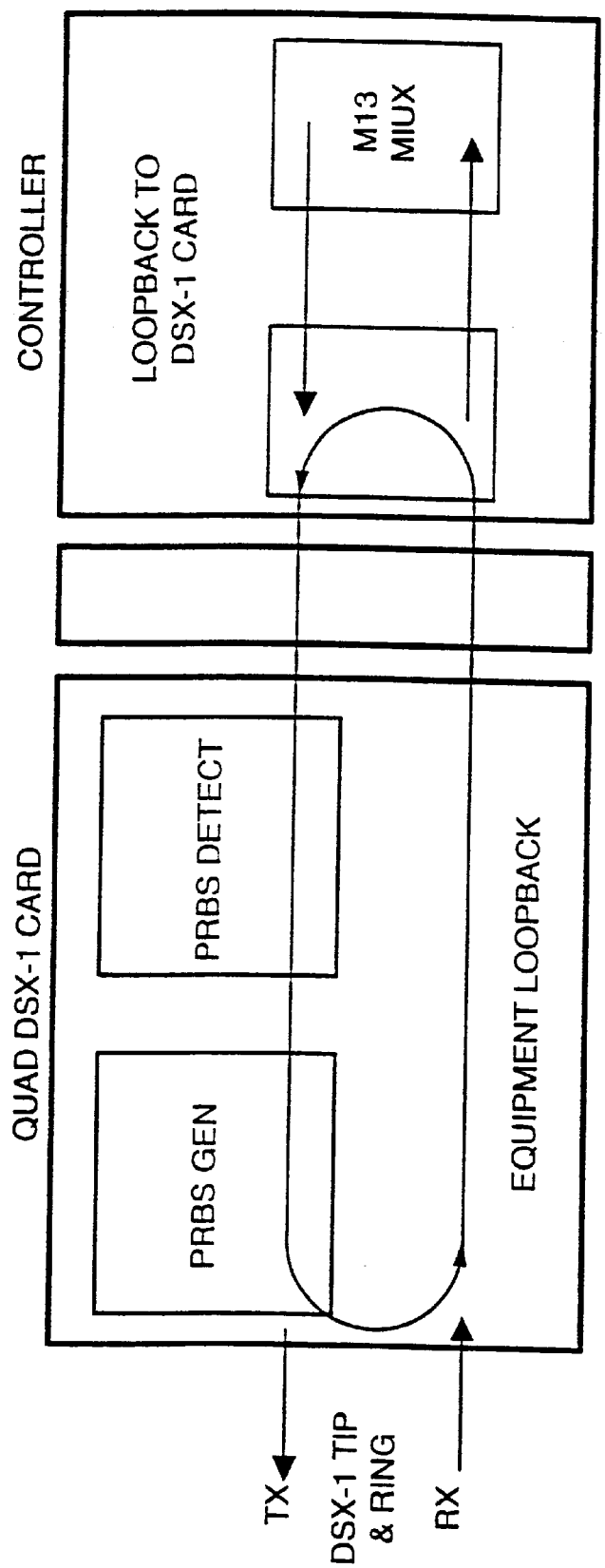
FIG. 20 is a simplified block diagram of portions of the multiplexer device of FIG. 1, showing one of multiple DSX-1 test modes.

FIG. 20 shows a DSX-1 test mode in which the PRBS generator 360 generates a PRBS signal which is routed into the received line (with the transceiver in equipment loopback), passed through to the controller cards 68 and 70, and looped back for detection by the PRBS detector 362 in the interface electronics 250 of the quad DSX-1 cards.

Figure 21:
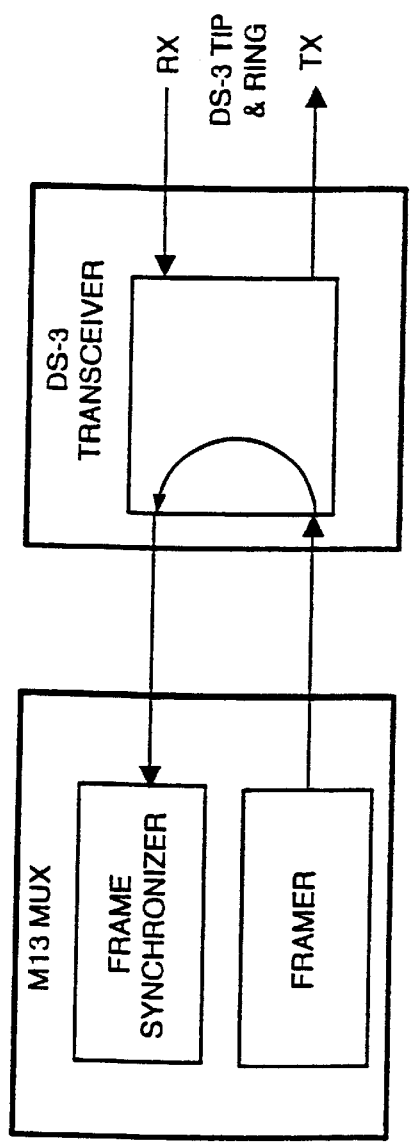
FIG. 21 is a simplified block diagram of portions of the multiplexer device of FIG. 1, showing one of multiple DS-3 test modes.

FIG. 21 shows a DS-3 test mode in which the DS-3 transceiver loops back the transmit signal to the received signal so that the frame synchronizer in the M1-3 multiplexer can determine whether appropriate frames are being received.

Figure 22:
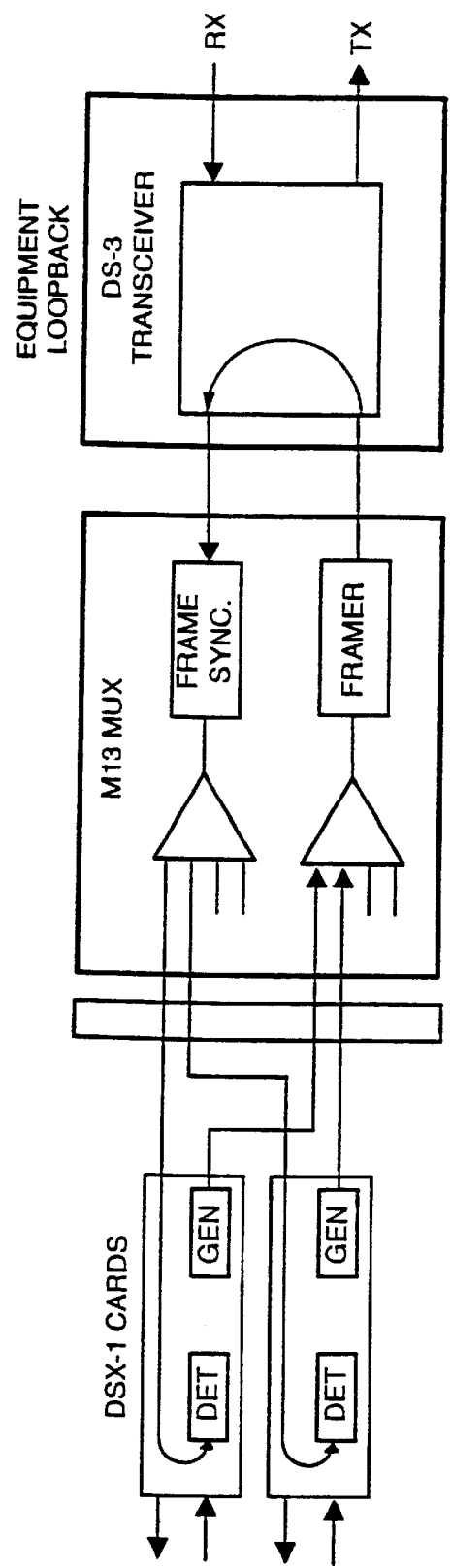
FIG. 22 is a simplified block diagram of portions of the multiplexer device of FIG. 1, showing a complete self-test mode.
Figure 23:
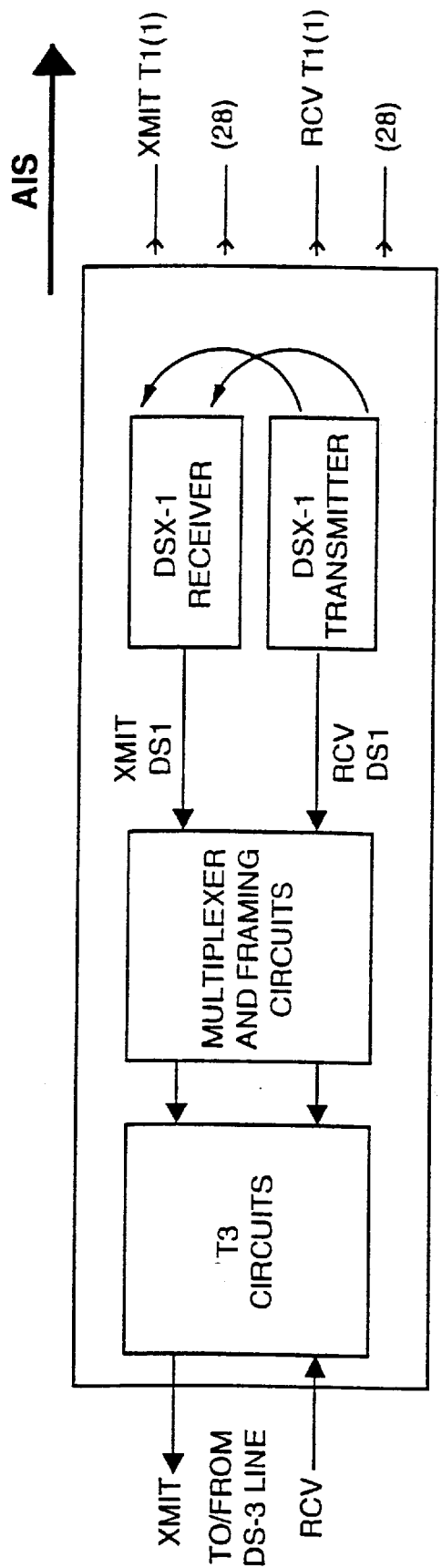
FIG. 23 is a simplified block diagram of portions of the multiplexer device of FIG. 1, showing a DS-1 NIU loopback mode.

FIG. 22 shows a complete self-test mode in which combines the other two test modes into a more comprehensive test. Note that one of the loopbacks from FIG. 20 is missing so that the signal generated on the DSX-1 card goes further through the device 20. The generation and detection occur at the same location as in FIG. 20.

Advantages

As can be appreciated from the above description of the preferred embodiment, the multiplexer device 20 of the present invention provides an M1-3 multiplexer in a package significantly reduced in size and volume while providing enhanced features and redundancy. Specifically, the multiplexer device 20 through its use of the novel dual backplane architecture is packaged in a standard rack mountable unit which is 19" wide and 1-¾" tall. Collapsing the functionality of an M1-3 multiplexer into a single rack unit is a drastic reduction in size from currently available models. It is believed that this reduction is due to improved selection of components in part, but primarily due to the novel dual backplane architecture. It should be noted that any backplane architecture which provides for multiple backplane surfaces, such as a triple backplane architecture, may achieve the desired effect.

The spare DSX-1 card 86 is available for replacing any of the primary cards 72–84 by the actuation of the appropriate relays. Alternatively, circuitry on the spare card 86 can be used to replace selected ones of the circuits on the primary card 72–84. In addition, actuation of the appropriate relays also allows loopback testing to be performed by looping back the tip and ring leads on the T-1 line.

The multiplexer device 20 also provides redundancy for the controller card, the card in which the actual multiplexing is performed. In addition, the multiplexer device provides redundancy for transmitting and receiving the DS signal from either of two different T-3 lines. The two controller cards 68 and 70 are constantly operating so that if it is necessary to switch to another card, the delays and consequent loss of data can be minimized.

Another advantage of the multiplexer device 20 of the present invention is the ability to have either of the controller cards 68 and 70 controlled and/or programmed by an external controller such as a computer terminal or any of various computers on a computer network such as an SNMP or Telnet session via Ethernet.

Further detail about the multiplexer device 20 is disclosed in the Wide Bank 28 DS-3 Access Multiplexer Installation & User's Guide, which is incorporated herein by reference. The foregoing description is considered as illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The invention claimed is:

1. A multiplexer device for telecommunications circuits for multiplexing and demultiplexing signals between a plurality of relatively lower speed telecommunication circuits and at least one relatively higher speed telecommunication circuit, the multiplexer device comprising:
   a multiplexer;
   a plurality of in-use cards, each card including a plurality of interface circuits, each interface circuit being connectable to one of the plurality of relatively lower speed telecommunication circuits and for supplying and receiving relatively lower speed data signals to and from the multiplexer;
   a spare card including a plurality of interface circuits, with each of the plurality of interface circuits being connectable to the plurality of in-use cards for selective replacement of selected ones of the interface circuits of selected ones of the in-use cards with selected ones of the interface circuits of the spare cards, at the same time that others of the interface circuits of the spare card are connectable to the plurality of in-use cards for selective replacement of selected ones of the interface circuits of selected other ones of the in-use cards with selected ones of the interface circuits of the spare cards, for supplying and receiving relatively lower speed data signals to and from the multiplexer when the spare card is selected.

2. A multiplexer device as defined in claim 1, wherein there are seven in-use cards with each having four interface circuits thereon, and wherein the spare card has four interface circuits thereon with the spare card connected to the in-use cards such that the spare card can completely replace one of the in-use cards or the interface circuits on the spare card can replace at least one of the interface circuits on up to four of the in-use cards.

3. A multiplexer device as defined in claim 1, wherein the spare card has loopback circuits provided thereon, the loopback circuits being selectable in place of the interface circuits on the spare card, to allow selected ones of the relatively lower speed telecommunications circuits to be looped back onto themselves.

4. A multiplexer device as defined in claim 3, wherein the loopback circuits include metallic loopback circuits.

5. A multiplexer device for telecommunications circuits for multiplexing and demultiplexing signals between a plurality of relatively lower speed telecommunication circuits and a relatively higher speed telecommunication circuit, the relatively higher speed telecommunication circuit being connectable to the multiplexer device through one or more telecommunications links, the multiplexer device comprising:
   a primary multiplexer circuit that can be selectively electronically enabled or disabled to place primary multiplexer the circuit in or out of an operational configuration;
   a secondary multiplexer circuit that can be selectively electronically enabled or disabled to place the primary multiplexer circuit in or out of an operational configuration;
   a controller communicating with the primary and secondary multiplexer circuits; and
   an interface to at least one of the telecommunication links between the multiplexer and the relatively higher speed telecommunication circuit;
   wherein the controller monitors the operational status of the primary and secondary multiplexer circuits and selectively electronically enables one of the primary and secondary multiplexer circuits and disables the other of the primary and secondary multiplexer circuits based on the monitoring.

6. A multiplexer device as defined in claim 5, wherein there are two telecommunications links, each one attached to a different one of the primary and secondary multiplexer circuits.

7. A multiplexer device as defined in claim 6, wherein a given one of the two telecommunication links can be selectively and alternatively attached to either one of the primary and secondary multiplexer circuits.

8. A multiplexer device for telecommunications circuits for multiplexing and demultiplexing signals between a plurality of relatively lower speed telecommunication circuits and a relatively higher speed telecommunication circuit, the relatively higher speed telecommunication circuit being connectable to the multiplexer device through one or more telecommunications links, the multiplexer device comprising:
   a primary multiplexer circuit that can be selected or deselected to place the primary multiplexer circuit in or out of an operational configuration;
   a secondary multiplexer circuit that can be selected or deselected to place the primary multiplexer circuit in or out of an operational configuration;
   a controller communicating with the primary and secondary multiplexer circuits; and an interface to at least one of the telecommunication links between the multiplexer device and the relatively higher speed telecommunication circuit;

wherein the controller monitors the operational status of the primary and secondary multiplexer circuits and selects one of the primary and secondary multiplexer circuits and deselects the other of the primary and secondary multiplexer circuits based on the monitoring, the transition time between one of the primary and secondary multiplexer circuits being in an operational configuration and the other of the priamry and secondary multiplexer circuits being in an operational configuration being sufficiently small to be a hitless transition.

9. A multiplexer device for telecommunications circuits for multiplexing and demultiplexing signals between a plurality of relatively lower speed telecommunication circuits and a relatively higher speed telecommunication circuit, the relatively higher speed telecommunication circuit being connectable to the multiplexer device through two different telecommunications links, the multiplexer device comprising:

a primary multiplexer circuit that can be selected or deselected to place the primary multiplexer circuit in or out of an operational configuration;

a secondary multiplexer circuit that can be selected or deselected to place the secondary multiplexer circuit in or out of an operational configuration;

an interface allowing a selected one of the primary and secondary multiplexer circuits to be connected to a selected one of the two telecommunications links and the other of the primary and secondary multiplexer circuits to be connected to the two other of the telecommunications links; and a controller communicating with the primary and secondary multiplexer circuits and the interface;

wherein the controller monitors the operational status of the primary and secondary multiplexer circuits and the two telecommunications links and selects one of the primary and secondary multiplexer circuits and one of the two telecommunication links and deselects the other of the primary and secondary multiplexer circuits and the other of the two telecommunications links based on the monitoring.

10. A multiplexer device for telecommunications circuits for multiplexing and demultiplexing signals between cabling from a plurality of relatively lower speed telecommunication circuits and from at least one relatively higher speed telecommunication circuit, the multiplexer device comprising:

a plurality of interface circuit cards, each having a plurality of relatively lower speed interface circuits thereon to interface with the relatively lower speed telecommunication circuits;

a multiplexer circuit card having components thereon for performing the multiplexing and demultiplexing; and a backplane assembly into which the interface circuit cards and the multiplexer cards are connectable and into which the cabling from the plurality of relatively lower speed telecommunication circuits and the at least one relatively higher speed telecommunication circuit are connectable, the backplane assembly including at least two separate backplanes, including an internal backplane and an external backplane, which are connected together so that the two backplanes are in a parallel and juxtaposed relationship, the internal backplane being mechanically and electrically connected to the interface circuit cards, to the multiplexer card, and to the external backplane, the external backplane being mechanically and electrically connected to the internal backplane and to the cabling from the plurality of relatively lower speed telecommunication circuits and the at least one relatively higher speed telecommunication circuit.

11. A multiplexer device for telecommunications circuits for multiplexing and demultiplexing signals between cabling from a plurality of relatively lower speed telecommunication circuits and from at least one relatively higher speed telecommunication circuit, the multiplexer device being externally controllable by an external controller on a computer network to which it may be connected, the device comprising:

a multiplexer;

a plurality of interface circuits interfacing between the plurality of relatively lower speed telecommunication circuits and the multiplexer and between the at least one relatively higher speed telecommunication circuit and the multiplexer;

an internal controller communicating with and controlling the multiplexer and the interface circuits; and an external connector connected to the internal controller and connectable to the computer network with the external controller being a part of the computer network, the external connector allowing the external controller to communicate with the internal controller through the computer network;

wherein the external controller can indirectly control the multiplexer and interface circuits through the internal controller.

12. A multiplexer device as defined in claim 11, wherein the computer network includes an Ethernet connection.

13. A multiplexer device for telecommunications circuits for multiplexing and demultiplexing signals between cabling from a plurality of relatively lower speed telecommunication circuits and from at least one relatively higher speed telecommunication circuit, the multiplexer device comprising:

a device housing;

a dual backplane connected to the device housing, the dual backplane including two separate backplanes, an internal backplane and an external backplane, which are connected together so that the two backplanes are in a parallel and juxtaposed relationship;

a plurality of interface circuit cards, each having a plurality of relatively lower speed interface circuits thereon to interface with the relatively lower speed telecommunication circuits, the interface circuit cards being receivable within the housing and being mechanically and electrically connectable to the dual backplane, one of the interface circuit cards being a spare card that can be selectively selected to replace one of the other interface circuit cards without physically moving the spare card; and a primary and a secondary multiplexer circuit card, each having components thereon for performing the multiplexing and demultiplexing, each multiplexer card being receivable within the housing and being mechanically and electrically connectable to the dual backplane, wherein either of the primary or the secondary multiplexer circuit cards can be selected to perform the multiplexing and demultiplexing;

wherein the interface circuit cards and the multiplexer cards are connectable into the dual backplane and the cabling from the plurality of relatively lower speed telecommunication circuits and the at least one relatively higher speed telecommunication circuit are connectable to the dual backplane, the internal backplane being mechanically and electrically connected to the interface circuit cards, to the multiplexer card, and to the external backplane, the external backplane being mechanically and electrically connected to the internal backplane and to the cabling from the plurality of relatively lower speed telecommunication circuits and the at least one relatively higher speed telecommunication circuit.

14. A multiplexer device for telecommunications circuits for multiplexing and demultiplexing signals between a plurality of relatively lower speed telecommunication circuits and at least one relatively higher speed telecommunication circuit, wherein the relatively lower speed telecommunication circuits carry data which can include loopback codes requesting the reflection back of a transmit portion of the relatively lower speed telecommunication circuit, as viewed by the circuit, into a receive portion of the relatively lower speed telecommunication circuit, the multiplexer device comprising:

a multiplexer;

a plurality of interface circuits, each interface circuit being connectable to one of the plurality of relatively lower speed telecommunication circuits and for supplying and receiving relatively lower speed data signals to and from the multiplexer, each interface circuit including a detector to detect loopback codes in the data passed through the relatively lower speed telecommunications circuit and including a loopback circuit that can be selectively switched in to reflect the transmit portion from the relatively lower speed telecommunications circuit back to the receive portion of the relatively lower speed telecommunications circuit in response to the detection of a loopback code.

15. A multiplexer device as defined in claim 14, wherein any of the interface circuits can switch in its loopback circuit independently of the remaining interface circuits.

16. A multiplexer device as defined in claim 14, wherein the loopback codes include loop-up and loop-down codes.

17. A multiplexer device as defined in claim 14, wherein the interface circuits also include a loopback code generator to generate loopback codes as desired to cause loopbacks to be created in the relatively lower speed telecommunication circuits to reflect data back toward the multiplexer device.

* * * * *